(12) United States Patent
Gao

(10) Patent No.: US 10,114,629 B2
(45) Date of Patent: Oct. 30, 2018

(54) METHOD AND DEVICE FOR DOWNLOADING PROFILE OF OPERATOR

(71) Applicant: HUAWEI DEVICE (DONGGUAN) CO., LTD., Dongguan (CN)

(72) Inventor: Linyi Gao, Beijing (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 80 days.

(21) Appl. No.: 15/173,027

(22) Filed: Jun. 3, 2016

(65) Prior Publication Data

US 2016/0283216 A1 Sep. 29, 2016

Related U.S. Application Data

(63) Continuation of application No. PCT/CN2014/093106, filed on Dec. 5, 2014.

(30) Foreign Application Priority Data

Dec. 5, 2013 (CN) .......................... 2013 1 0654647

(51) Int. Cl.
*G06F 9/445* (2018.01)
*G06F 8/61* (2018.01)
(Continued)

(52) U.S. Cl.
CPC ............ *G06F 8/61* (2013.01); *H04L 63/0428* (2013.01); *H04L 67/303* (2013.01); *H04W 8/20* (2013.01)

(58) Field of Classification Search
CPC .... H04W 8/20; H04L 67/303; H04L 63/0428; G06F 8/61
(Continued)

(56) References Cited

U.S. PATENT DOCUMENTS 9,451,459 B2 * 9/2016 Lee ...................... H04W 12/06
9,462,457 B2 10/2016 Gao et al.
(Continued)

FOREIGN PATENT DOCUMENTS

CN 1787665 6/2006
CN 101114933 1/2008
(Continued)

OTHER PUBLICATIONS

International Search Report dated Mar. 6, 2015 in corresponding International Application No. PCT/CN2014/093106.
(Continued)

*Primary Examiner* — Marina Lee
(74) *Attorney, Agent, or Firm* — Staas & Halsey LLP

(57) ABSTRACT

Embodiments of the present invention provide a method and device for downloading a profile of an operator, where one method includes: sending, by a terminal to the SM-DP by using an SM-SR, a request for downloading a profile of an operator, where the download request carries the download certificate, an ID of an eUICC of the terminal, and addressing information of the SM-DP; and receiving, by the terminal, the profile of the operator that is sent by the SM-DP by using the SM-SR and is corresponding to the download request, and transmitting the profile of the operator to the eUICC, where the profile of the operator is obtained by the SM-DP according to an identity of the profile of the operator after the SM-DP verifies that the certificate that is for downloading the profile of the operator and is carried in the download request is valid.

21 Claims, 11 Drawing Sheets

(51) Int. Cl.
  *H04W 8/20* (2009.01)
  *H04L 29/06* (2006.01)
  *H04L 29/08* (2006.01)
(58) Field of Classification Search
  USPC .......................................................... 717/178
  See application file for complete search history.

(56) References Cited

U.S. PATENT DOCUMENTS

| | | | |
|---|---|---|---|
| 2006/0085848 | A1 | 4/2006 | Aissi et al. |
| 2008/0114570 | A1 | 5/2008 | Li et al. |
| 2009/0036126 | A1 | 2/2009 | Morikumi et al. |
| 2009/0111467 | A1 | 4/2009 | Chai et al. |
| 2010/0279674 | A1 | 11/2010 | Zou et al. |
| 2011/0191252 | A1* | 8/2011 | Dai ................ G06Q 20/10 705/71 |
| 2012/0115440 | A1 | 5/2012 | Naito et al. |
| 2012/0190354 | A1 | 7/2012 | Merrien et al. |
| 2013/0012168 | A1* | 1/2013 | Rajadurai ............ H04L 9/0822 455/411 |
| 2013/0157673 | A1 | 6/2013 | Brusilovsky |
| 2013/0231087 | A1 | 9/2013 | O'Leary |
| 2013/0281077 | A1 | 10/2013 | Zou et al. |
| 2013/0339305 | A1* | 12/2013 | Kim ................ G06F 17/30283 707/652 |
| 2014/0011541 | A1 | 1/2014 | Cormier et al. |
| 2014/0012755 | A1 | 1/2014 | Walker et al. |
| 2014/0235210 | A1 | 8/2014 | Park et al. |
| 2014/0237101 | A1 | 8/2014 | Park |
| 2014/0287725 | A1 | 9/2014 | Lee |
| 2014/0329502 | A1* | 11/2014 | Lee ................ H04W 12/06 455/411 |
| 2015/0011202 | A1 | 1/2015 | Guo et al. |
| 2015/0087269 | A1* | 3/2015 | Lee ................ H04W 12/06 455/411 |
| 2015/0208239 | A1 | 7/2015 | Bai et al. |
| 2016/0337861 | A1 | 11/2016 | Hawkes et al. |
| 2017/0289792 | A1 | 10/2017 | Park |

FOREIGN PATENT DOCUMENTS

| | | |
|---|---|---|
| CN | 101119387 | 2/2008 |
| CN | 101146346 | 3/2008 |
| CN | 101159615 | 4/2008 |
| CN | 101453714 A | 6/2009 |
| CN | 101471871 | 7/2009 |
| CN | 102184110 A | 9/2011 |
| CN | 102314408 | 1/2012 |
| CN | 102497630 | 6/2012 |
| CN | 102630081 | 8/2012 |
| CN | 102917338 A | 2/2013 |
| CN | 101895844 B | 6/2013 |
| CN | 103370915 | 10/2013 |
| CN | 103686587 | 3/2014 |
| CN | 103747104 | 4/2014 |
| CN | 103782568 | 5/2014 |
| EP | 2222024 | 8/2010 |
| EP | 2 461 613 A1 | 6/2012 |
| EP | 2854432 | 4/2015 |
| EP | 2858393 | 4/2015 |
| EP | 2575292 | 6/2016 |
| FR | 2994048 | 1/2014 |
| KR | 1020130026958 A | 3/2013 |
| KR | 1020130049726 | 5/2013 |
| WO | WO2012076464 | 6/2012 |
| WO | WO2012085593 | 6/2012 |
| WO | 2013/027085 A1 | 2/2013 |
| WO | WO2013036010 | 3/2013 |
| WO | WO2013048084 | 4/2013 |
| WO | WO2013123233 | 8/2013 |
| WO | WO2013176499 | 11/2013 |
| WO | WO2014059913 | 4/2014 |

OTHER PUBLICATIONS

International Search Report dated Mar. 6, 2015 in corresponding International Patent Application No. PCT/CN2014/093106.
Extended European Search Report dated Sep. 28, 2016 in corresponding European Patent Application No. 14867716.4.
GSM Association, "LS on GSMA's Embedded SIM Remote Provisioning Architecture Document", ETSI TC SCP REQ Meeting #44, Tdoc SCPREQ(13)000077, NJ, USA, Jul. 8-10, 2013, (p. 1).
Apple, "eUICC security framework", ETSI SCPTEC #47 SCPTEC(13)000037, 2013, pp. 1-12.
"Reprogrammable SIMs: Technology, Evolution and Implications", CSMG, XP-002716258, London, UK, Sep. 2012, pp. 1-96.
"Remote Provisioning Architecture for Embedded UICC", GSM Association, Version 1.43, Jul. 2013, pp. 1-82.
"GSMA's Embedded SIM Remote Provisioning Architecture Document", Liaison Statement, May 2013, pp. 1-2.
International Search Report, dated Jan. 16, 2014, in International Application No. PCT/CN2013/085222 (4 pp.).
Written Opinion of the International Searching Authority, dated Jan. 16, 2014, in International Application No. PCT/CN2013/085222 (8 pp.).
International Search Report, dated Jan. 23, 2014, in International Application No. PCT/CN2013/086644 (4 pp.).
Written Opinion of the International Searching Authority, dated Jan. 23, 2014, in International Application No. PCT/CN2013/086644 (10 pp.).
International Search Report, dated Feb. 26, 2015, in International Application No. PCT/CN2014/078257 (4 pp.).
International Search Report, dated Mar. 27, 2015, in International Application No. PCT/CN2014/081776 (5 pp.).
Extended European Search Report, dated Oct. 2, 2015, in European Application No. 13847443.2 (4 pp.).
Extended European Search Report, dated Oct. 28, 2015, in European Application No. 13852843.5 (10 pp.).
Office Action, dated May 4, 2016, in Chinese Application No. 201210390400.9 (6 pp.).
Extended European Search Report, dated Apr. 6, 2017, in European Application No. 14892527.4 (9 pp.).
Extended European Search Report, dated May 9, 2017, in European Application No. 14897155.9 (9 pp.).
Office Action, dated Dec. 11, 2017, in Chinese Patent Application 201480056228.0.
Office Action, dated Mar. 14, 2018, in Korean Application No. 102016703533.
Embedded SIM Task Force Requirements and Use Cases 1.0, Feb. 21, 2011, GSM Association, XP062097169, pp. 1-38.
Embedded UICC, A High Level Remote Provisioning Architecture, GSMA Embedded SIM Task Force Technical Stream, XP014099004 (16 pp.).
<Smart Cards; Embedded UICC; Requirements Specification>, Draft ETSI TS 103 383 V<0.0.6>, May 2011, XP14099322, pp. 1-20.
Smart Cards; Embedded UICC; Technical Specification (Release 12), ETSI TS 103 384 V0.6.0 (Mar. 2014), pp. 1-14.
Smart Cards; Embedded UICC; Requirements Specification (Release 12), ETSI TS 103 383 V12.4.0 (Apr. 2014), pp. 1-22.
eUICC Manager, Apple, Inc., May 25, 2014, SCPTEC(14)000075 (4 pp.).
Change Request for eUICC Architecture, ETSI TC SCP TEC Meeting #52, Seoul, South Korea, Jun. 2-6, 2014 SCPTEC(13)000130r6 (4 pp.).
Zhimin, D., Embedded UICC and its Remote Management Technology, pp. 48-51.
Office Action, dated Aug. 11, 2016, in U.S. Appl. No. 14/586,664.
Final Office Action, dated Mar. 10, 2017, in U.S. Appl. No. 14/586,664.
Notice of Allowance, dated Jun. 27, 2017, in U.S. Appl. No. 14/586,664.
Office Action, dated Feb. 25, 2016, in U.S. Appl. No. 14/705,294.
Notice of Allowance, dated Jul. 27, 2016, in U.S. Appl. No. 14/705,294.
Office Action, dated Aug. 21, 2017, in U.S. Appl. No. 15/358,506.

(56) References Cited

OTHER PUBLICATIONS

Notice of Allowance, dated Mar. 21, 2018, in U.S. Appl. No. 15/358,506.
Office Action, dated Jul. 25, 2016, in Chinese Application No. 201210437614.7 (7 pp.).

* cited by examiner

METHOD AND DEVICE FOR DOWNLOADING PROFILE OF OPERATOR

CROSS-REFERENCE TO RELATED APPLICATIONS

This application is a continuation of international Application No. PCT/CN2014/093106, filed on Dec. 5, 2014, which claims priority to Chinese Patent Application No. 201310654647.1, filed on Dec. 5, 2013, both of which are hereby incorporated by reference in their entireties.

TECHNICAL FIELD

Embodiments of the present invention relate to the field of electronic technologies, and in particular, to a method and device for downloading a profile of an operator.

BACKGROUND

An embedded universal integrated circuit card (eUICC) is formed by embedding (packaging, welding, or the like) a conventional universal integrated circuit card (UICC) into a terminal, which cannot be inserted or removed, and cannot be freely changed as a conventional UICC card either.

An existing SIM card or UICC card is generally ordered by a mobile network operator (MNO) from a card manufacturer, and therefore, subscription information that is needed for accessing a network of a mobile operator has been downloaded into the card before factory delivery. After purchasing a SIM card or a UICC card, a user can access a network after inserting the card into a terminal. However, an eUICC is unnecessarily purchased by an operator, and may be integrated into a terminal for selling after a terminal manufacturer purchases the card. Therefore, in a profile of the eUICC, only one file can access a remote management platform (such as a subscription manager-secure routing (SM-SR)). After the eUICC is embedded into the terminal, a profile (marked as a profile) of an operator may be downloaded into the eUICC according to a remote management technology by using a subscription manager-data preparing (SM-DP) and the SM-SR. Then, the eUICC may access a network by using the downloaded profile.

Currently, the Global System for Mobile Communications Assembly (GMSA) formulates a method for downloading a profile of an operator, and a procedure of the method is generally as follows:

Step 1: An MNO sends, to an SM-DP, a request for downloading a profile, where the request carries an identity (Identity, ID) of an SM-SR, an ID of a target eUICC (eID), and an integrated circuit card identity (Integrate Circuit Card Identity, ICCID) of the profile that needs to be downloaded.

Step 2: The SM-DP finds, according to the ID of the SM-SR, an SM-SR with which the eUICC currently registers.

Step 3: The SM-DP requests related information (which is included in an eUICC information set (eUICC Information Set, EIS), and may specifically include: a type, a version number, a production data that are of the eUICC, a credential of the eUICC, current files that are of various operators and are in the eUICC and statuses of the profiles, current storage space of the eUICC, and the like) of the eUICC from the SM-SR.

Step 4: The SM-DP determines, according to the EIS, whether the profile can be downloaded into the eUICC (for example, the SM-DP determines whether the credential of the eUICC is valid, whether the storage space of the eUICC is sufficient, and the like).

Step 5: If the SM-DP finds that the profile cannot be downloaded into the eUICC (for example, the SM-DP determines that the credential of the eUICC is invalid, or the storage space of the eUICC is insufficient), the SM-DP returns error information to the SM-SR and the MNO.

Step 6: If the SM-DP finds that the profile can be downloaded into the eUICC, the SM-DP sends a request for downloading and installing the profile, and sends an encrypted profile to the eUICC; the eUICC decrypts the profile and installs the profile.

It can be learned from the foregoing procedure that, in the prior art, a procedure for downloading a profile is sent from a network side (MNO), and the MNO needs to know an identity (ID) of an eUICC in advance. However, different from a UICC, the eUICC is unnecessarily purchased by the MNO, and may be purchased by a device manufacturer; therefore, the MNO unnecessarily knows the ID of the eUICC in advance. When the MNO does not know an ID of an eUICC of a device, the solution in the prior art cannot be implemented. In addition, in the prior art, an object that can download the profile are only some authorized eUICCs. In addition, because the request for downloading the profile is sent from the MNO on the network side, it is required to ensure that when the profile is being downloaded, a terminal device has been started and a connection between the terminal device and an SM-SR has been established, and an end user cannot freely select an opportunity for downloading the profile.

SUMMARY

Embodiments of the present invention provide a method for downloading a profile of an operator, a terminal, an embedded universal integrated circuit card, and a subscription manager-data preparing. A terminal side (a terminal of an eUICC) may initiate a request for downloading a profile of an operator, and the operator does not need to know an identity of the eUICC in advance; a range of objects that can download the profile of the operator may be extended to all eUICCs, and an end user may freely select an opportunity for downloading the profile of the operator.

A first aspect of the present invention provides a method for downloading a profile of an operator, where the method may include:

sending, by a terminal to a SM-DP by using a SM-SR, a request for downloading a profile of an operator, where the download request carries a certificate for downloading the profile of the operator, an ID of an embedded universal integrated circuit card eUICC of the terminal, and addressing information of the SM-DP; and receiving, by the terminal, the profile of the operator that is sent by the SM-DP by using the SM-SR and is corresponding to the download request, and transmitting the profile of the operator to the eUICC, where the profile of the operator is obtained by the SM-DP according to an identity of the profile of the operator after the SM-DP verifies that the certificate that is for downloading the profile of the operator and is carried in the download request is valid.

With reference to the first aspect, in a first feasible implementation manner, before the sending, by a terminal to an SM-DP by using a SM-SR, a request for downloading a profile of an operator, the method further includes:

acquiring, by the terminal, the download certificate used to download the profile of the operator and the addressing information of the SM-DP that stores the profile of the operator.

With reference to the first aspect, in a second feasible implementation manner, the sending, by a terminal to an SM-DP by using a SM-SR, a request for downloading a profile of an operator includes:

sending, by the terminal to an SM-SR with which the eUICC registers, the request for downloading the profile of the operator, where the download request carries the certificate for downloading the profile of the operator, the ID of the embedded universal integrated circuit card eUICC of the terminal, and the addressing information of the SM-DP, so that after finding the SM-DP according to the addressing information of the SM-DP, the SM-SR forwards, to the SM-DP, the download request that includes the certificate for downloading the profile of the operator and the ID of the eUICC.

With reference to the first feasible implementation manner of the first aspect, in a third feasible implementation manner, after the acquiring, by the terminal, the download certificate used to download the profile of the operator and the addressing information of the SM-DP that stores the profile of the operator, the method further includes:

sending, by the terminal to the eUICC, the acquired download certificate used to download the profile of the operator and the acquired addressing information of the SM-DP that stores the profile of the operator.

With reference to the first feasible implementation manner of the first aspect, in a fourth feasible implementation manner, the acquiring, by the terminal, the download certificate used to download the profile of the operator and the addressing information of the SM-DP that stores the profile of the operator includes:

logging in, by the terminal by using built-in application software of the terminal, to a network platform of the operator, and acquiring, from the network platform, the download certificate used to download the profile of the operator and the addressing information of the SM-DP that stores the profile of the operator; or receiving, by the terminal, the download certificate used to download the profile of the operator and the addressing information of the SM-DP that stores the profile of the operator, where the download certificate and the addressing information are entered by a user; or acquiring, by the terminal by scanning a two-dimensional code, the download certificate used to download the profile of the operator and the addressing information of the SM-DP that stores the profile of the operator.

With reference to the first aspect, in a fifth feasible implementation manner, before the sending, by a terminal to an SM-DP by using a SM-SR, a request for downloading subscription data of an operator, the method includes:

reading, by the terminal from the eUICC, the ID of the eUICC and addressing information of an SM-SR with which the eUICC registers, and finding the SM-SR according to the addressing information; and generating, by the terminal, the request for downloading the profile of the operator, where the download request carries the certificate for downloading the profile of the operator, the ID of the eUICC of the terminal, and the addressing information of the SM-DP.

With reference to the third feasible implementation manner of the first aspect, in a sixth feasible implementation manner, before the sending, by a terminal to an SM-DP by using a SM-SR, a request for downloading a profile of an operator, the method includes: receiving, by the terminal from the eUICC, the request that is for downloading the profile of the operator and is generated by the eUICC, where the download request carries the certificate for downloading the profile of the operator, the ID of the eUICC of the terminal, and the addressing information of the SM-DP.

With reference to the sixth feasible implementation manner of the first aspect, in a seventh feasible implementation manner, before the receiving, by the terminal from the eUICC, the request that is for downloading the profile of the operator and is generated by the eUICC, the method further includes:

sending, by the terminal to the eUICC, a command of requesting or instructing the eUICC to generate and send the request for downloading the profile of the operator.

With reference to any one of the first aspect to the seventh feasible implementation manner of the first aspect, in an eighth feasible implementation manner, the certificate for downloading the profile of the operator is a randomly generated sequence code; or the certificate for downloading the profile of the operator is a string of encoded data generated by encrypting metadata of the profile of the operator, where the metadata is extracted from the profile of the operator.

With reference to the eighth feasible implementation manner of the first aspect, in a ninth feasible implementation manner, when the download request includes the addressing information of the SM-DP, the addressing information of the SM-DP is carried in the randomly generated sequence code or the encoded data.

With reference to any one of the first aspect to the seventh feasible implementation manner of the first aspect, in a tenth feasible implementation manner, the download request further carries the identity of the profile of the operator, and the identity of the profile of the operator is a part of the download certificate or is independent of the download certificate; and the SM-DP specifically obtains the profile of the operator according to the identity that is of the profile of the operator and is carried in the download request.

It can be learned from above that, in some feasible implementation manners of the present invention, a request for downloading a profile of an operator is initiated by a terminal in this embodiment of the present invention, which avoids a case in which the operator needs to know, in advance, identity information of an eUICC of the terminal that needs to download the profile of the operator. In addition, in this embodiment of the present invention, an SM-DP verifies whether a download certificate in the download request is valid to determine whether the initiated download request is valid, without verifying whether an object that initiates the download request is valid any longer; moreover, the download certificate may be obtained by the terminal before the terminal initiates the download request. Therefore, the terminal can acquire the certificate for downloading the profile of the operator. provided that the terminal needs to download the profile of the operator into the eUICC of the terminal. That is, in this embodiment of the present invention, a range of objects that can download the profile of the operator may be extended to all eUICCs. In addition, in this embodiment of the present invention, because the request for downloading the profile of the operator is initiated by the terminal, an end user certainly can freely select an opportunity for downloading the profile of the operator.

A second aspect of the present invention provides a method for downloading a profile of an operator, where the method may include:

sending, by an embedded universal integrated circuit card eUICC by using a SM-SR, a download request generated by the eUICC to a SM-DP, where the download request carries a certificate for downloading a profile of the operator, an ID of the embedded universal integrated circuit card eUICC of the terminal, and addressing information of the SM-DP; and receiving, by the eUICC, the profile of the operator that is sent by the SM-DP by using the SM-SR and is corresponding to the download request, where the profile of the operator is obtained by the SM-DP according to an identity of the profile of the operator after the SM-DP verifies that the certificate that is for downloading the profile of the operator and is carried in the download request is valid.

With reference to the second aspect, in a first feasible implementation manner, before the sending, by an eUICC by using a SM-SR, a download request generated by the eUICC to a SM-DP, the method further includes:

acquiring, by the eUICC, the download certificate used to download the profile of the operator and the addressing information of the SM-DP that stores the profile of the operator; and generating, by the eUICC, the request for downloading the profile of the operator.

With reference to the first feasible implementation manner of the second aspect, in a second feasible implementation manner, the acquiring, by the eUICC, the download certificate used to download the profile of the operator and the addressing information of the SM-DP that stores the profile of the operator includes:

receiving, by the eUICC from the terminal, the download certificate used to download the profile of the operator and the addressing information of the SM-DP that stores the profile of the operator; or receiving, by the eUICC, the download certificate used to download the profile of the operator and the addressing information of the SM-DP that stores the profile of the operator, where the download certificate and the addressing information are entered by a user by using an interface of software that is in the eUICC and is for downloading a profile of an operator; or logging in, by the eUICC by using built-in application software of the eUICC, to a network platform of the operator, and acquiring, from the network platform, the download certificate used to download the profile of the operator and the addressing information of the SM-DP that stores the pro file of the operator.

With reference to the second aspect, in a third feasible implementation manner, the sending, by an eUICC by using a SM-SR, a download request generated by the eUICC to an SM-DP includes:

sending, by the eUICC, the download request generated by the eUICC to an SM-SR with which the eUICC registers, where the download request carries the certificate for downloading the profile of the operator, the ID of the eUICC, and the addressing information of the SM-DP, so that after finding the SM-DP according to the addressing information of the SM-DP, the SM-SR forwards, to the SM-DP, the download request that includes the certificate for downloading the profile of the operator and the ID of the eUICC.

With reference to the second aspect, in a fourth feasible implementation manner, before the generating, by the eUICC, the request for downloading the profile of the operator, the method includes:

receiving, by the eUICC from the terminal, a command of requesting or instructing the eUICC to generate and send the request for downloading the profile of the operator.

With reference to any one of the second aspect to the fourth feasible implementation manner of the second aspect, in a fifth feasible implementation manner, the certificate for downloading the profile of the operator is a randomly generated sequence code; or the certificate for downloading the profile of the operator is a string of encoded data generated by encrypting metadata of the profile of the operator, where the metadata is extracted from the profile of the operator.

With reference to the fifth feasible implementation manner of the second aspect, in a sixth feasible implementation manner, when the download request includes the addressing information of the SM-DP, the addressing information of the SM-DP is carried in the randomly generated sequence code or the encoded data.

With reference to any one of the second aspect to the fourth feasible implementation manner of the second aspect, in a seventh feasible implementation manner, the download request further carries the identity of the profile of the operator, and the identity of the profile of the operator is a part of the download certificate or is independent of the download certificate; and the SM-DP specifically obtains the profile of the operator according to the identity that is of the profile of the operator and is carried in the download request.

It can be learned from above that, in some feasible implementation manners of the present invention, a request for downloading a profile of an operator is initiated by an eUICC of a terminal in this embodiment of the present invention, which avoids a case in which the operator needs to know, in advance, identity information of the eUICC of the terminal that needs to download the profile of the operator. In addition, in this embodiment of the present invention, an SM-DP verifies whether a download certificate in the download request is valid to determine whether the initiated download request is valid, without verifying whether an object that initiates the download request is valid any longer; moreover, the download certificate may be obtained by the terminal before the terminal initiates the download request. Therefore, the terminal can acquire the certificate for downloading the profile of the operator, provided that the terminal needs to download the profile of the operator into the eUICC of the terminal. That is, in this embodiment of the present invention, a range of objects that can download the profile of the operator may be extended to all eUICCs. In addition, in this embodiment of the present invention, because the request for downloading the profile of the operator is initiated by the terminal, an end user certainly can freely select an opportunity for downloading the profile of the operator.

A third aspect of the present invention provides a method for downloading a profile of an operator, where the method may include:

receiving, by a SM-DP from a terminal or an embedded universal integrated circuit card eUICC of the terminal, a request that is for downloading a profile of an operator and is forwarded by a SM-SR, where the download request carries an ID of the eUICC and a certificate for downloading the profile of the operator;

after verifying that the certificate that is for downloading the profile of the operator and is carried in the download request is valid, acquiring, by the SM-DP according to an identity of the profile of the operator, the profile of the operator that is stored in the SM-DP and is corresponding to the download request; and sending, by the SM-DP by using the SM-SR, the profile that is of the operator and is corresponding to the download request to the eUICC.

With reference to the third aspect, in a first feasible implementation manner, before the receiving, by a SM-DP from a terminal or an embedded universal integrated circuit card eUICC of the terminal, a request that is for downloading a profile of an operator and is forwarded by a SM-SR, the method further includes:

receiving and storing, by the SM-DP, the certificate for downloading the profile of the operator and the identity of the profile of the operator, where the download certificate and the identity are generated by the operator; or generating and storing, by the SM-DP according to a request of the operator, the certificate for downloading the profile of the operator and the identity of the profile of the operator.

With reference to the third aspect or the first feasible implementation manner of the third aspect, in a second feasible implementation manner, the certificate for downloading the profile of the operator is a randomly generated sequence code; and when verifying that a sequence code that is carried in the download request and is used as the download certificate is the same as a sequence code stored in the SM-DP, the SM-DP determines that the certificate that is for downloading the profile of the operator and is carried in the download request is valid.

With reference to the third aspect or the first feasible implementation manner of the third aspect, in a third feasible implementation manner, the certificate for downloading the profile of the operator is a string of encoded data generated by encrypting metadata of the operator; and when metadata obtained after the SM-DP decodes, according to a locally stored decryption key, encoded data carried in the download request is the same as metadata that is of the profile of the operator and is stored in the SM-DP the SM-DP determines that the certificate that is for downloading the profile of the operator and is carried in the download request is valid.

With reference to the third aspect or the first feasible implementation manner of the third aspect, in a fourth feasible implementation manner, the download request further carries the identity of the profile of the operator, and the identity of the profile of the operator is a part of the download. certificate or is independent of the download certificate; and the SM-DP specifically obtains the profile of the operator according to the identity that is of the profile of the operator and is carried in the download request.

It can be learned from above that, in some feasible implementation manners of the present invention, a SM-DP receives, from a terminal or an embedded universal integrated circuit card eUICC of the terminal, a request that is for downloading a profile of an operator and is forwarded by a SM-SR, where the download request carries an ID of the eUICC and a certificate for downloading the profile of the operator; after verifying that the certificate that is for downloading the profile of the operator and is carried in the download request is valid, the SM-DP acquires, according to an identity of the profile of the operator, the profile of the operator that is stored in the SM-DP and is corresponding to the download request; and the SM-DP sends, by using the SM-SR, the profile that is of the operator and is corresponding to the download request to the eUICC. In this embodiment of the present invention, a request for downloading a profile of an operator is initiated by a terminal side (a terminal or an eUICC of a terminal), thereby avoiding a case in which the operator needs to know, in advance, identity information of the eUICC of the terminal that needs to download the profile of the operator. In addition, in this embodiment of the present invention, an SM-DP verifies whether a download certificate in the download request is valid to determine whether the initiated download request is valid, without verifying whether an object that initiates the download request is valid any longer; moreover, the download certificate may be obtained by the terminal before the terminal initiates the download request. Therefore, the terminal can acquire the certificate for downloading the profile of the operator, provided that the terminal needs to download the profile of the operator into the eUICC of the terminal. That is, in this embodiment of the present invention, a range of objects that can download the profile of the operator may be extended to all eUICCs. In addition, in this embodiment of the present invention, because the request for downloading the profile of the operator is initiated by the terminal, an end user certainly can freely select an opportunity for downloading the profile of the operator.

A fourth aspect of the present invention provides a terminal, where the terminal includes an embedded universal integrated circuit card eUICC, and may further include:

a sending module, configured to send, to a SM-DP by using a SM-SR, a request for downloading a profile of an operator, where the download request carries a certificate for downloading the profile of the operator, an ID of the eUICC, and addressing information of the SM-DP; and a transmission module, configured to: receive the profile of the operator that is sent by the SM-DP by using the SM-SR and is corresponding to the download request, and transmit the profile of the operator to the eUICC, where the profile of the operator is obtained by the SM-DP according to an identity of the profile of the operator after the SM-DP verifies that the certificate that is for downloading the profile of the operator and is carried in the download request is valid.

With reference to the fourth aspect, in a first feasible implementation manner, the terminal further includes:

an acquiring module, configured to acquire the download certificate used to download the profile of the operator and the addressing information of the SM-DP that stores the profile of the operator.

With reference to the fourth aspect, in a second feasible implementation manner, the sending module is specifically configured to send, to an SM-SR with which the eUICC registers, the request for downloading the profile of the operator, where the download request carries the certificate for downloading the profile of the operator, the ID of the embedded universal integrated circuit card eUICC of the terminal, and the addressing information of the SM-DP, so that after finding the SM-DP according to the addressing information of the SM-DP, the SM-SR forwards, to the SM-DP, the download request that includes the certificate for downloading the profile of the operator and the ID of the eUICC.

With reference to the first feasible implementation manner of the fourth aspect, in a third feasible implementation manner, the transmission module is further configured to send, to the eUICC, the download certificate used to download the profile of the operator and the addressing information of the SM-DP that stores the profile of the operator, where the download certificate and the addressing information are acquired by the acquiring module.

With reference to the first feasible implementation manner of the fourth aspect, in a fourth feasible implementation manner, the acquiring module includes:

a first acquiring module, configured to: log in to a network platform of the operator by using built-in application software of the terminal; and acquire, from the network platform, the download certificate used to download the profile of the operator and the addressing information of the SM-DP that stores the profile of the operator; or a second acquiring module, configured to receive the download certificate used to download the profile of the operator and the addressing information of the SM-DP that stores the profile of the operator, where the download certificate and the addressing information are manually entered by a user; or a third acquiring module, configured to acquire, by scanning a two-dimensional code, the download certificate used to download the profile of the operator and the addressing information of the SM-DP that stores the profile of the operator.

With reference to the fourth aspect, in a fifth feasible implementation manner, the terminal further includes:

a reading module, configured to: read, from the eUICC, the ID of the eUICC and addressing information of an SM-SR with which the eUICC registers; and find the SM-SR according to the addressing information; and a generating module, configured to: generate the request for downloading the profile of the operator, and transmit the generated download request to the sending module, where the download request carries the certificate for downloading the profile of the operator, the ID of the eUICC of the terminal, and the addressing information of the SM-DP.

With reference to the third feasible implementation manner of the fourth aspect, in a sixth feasible implementation manner, the transmission module is further configured to: receive, from the eUICC, the request that is for downloading the profile of the operator and is generated by the eUICC; and transmit the received download request to the sending module, where the download request carries the certificate for downloading the profile of the operator, the ID of the eUICC of the terminal, and the addressing information of the SM-DP.

With reference to the sixth feasible implementation manner of the fourth aspect, in a seventh feasible implementation manner, the transmission module is further configured to send, to the eUICC, a command of requesting or instructing the eUICC to generate and send the request for downloading the profile of the operator.

With reference to the fourth aspect to the seventh feasible implementation manner of the fourth aspect, in an eighth feasible implementation manner, the certificate for downloading the profile of the operator is a randomly generated sequence code; or the certificate for downloading the profile of the operator is a string of encoded data generated by encrypting metadata of the operator, where the metadata is extracted from the profile of the operator.

With reference to the eighth feasible implementation manner of the fourth aspect, in a ninth feasible implementation manner, when the download request includes the addressing information of the SM-DP, the addressing information of the SM-DP is carried in the randomly generated sequence code or the encoded data.

With reference to the fourth aspect to the seventh feasible implementation manner of the fourth aspect, in a tenth feasible implementation manner, the download request sent by the sending module further carries the identity of the profile of the operator, and the identity of the profile of the operator is a part of the download certificate or is independent of the download certificate; and the SM-DP specifically obtains the profile of the operator according to the identity that is of the profile of the operator and is carried in the download request.

It can be learned from above that, in some feasible implementation manners of the present invention, a request for downloading a profile of an operator is initiated by a terminal in this embodiment of the present invention, which avoids a case in which the operator needs to know, in advance, identity information of an eUICC of the terminal that needs to download the profile of the operator. In addition, in this embodiment of the present invention, an SM-DP verifies whether a download certificate in the download request is valid to determine whether the initiated download request is valid, without verifying whether an object that initiates the download request is valid any longer; moreover, the download certificate may be obtained by the terminal before the terminal initiates the download request. Therefore, the terminal can acquire the certificate for downloading the profile of the operator, provided that the terminal needs to download the profile of the operator into the eUICC of the terminal. That is, in this embodiment of the present invention, a range of objects that can download the profile of the operator may be extended to all eUICCs. In addition, in this embodiment of the present invention, because the request for downloading the profile of the operator is initiated by the terminal, an end user certainly can freely select an opportunity for downloading the profile of the operator.

A fifth aspect of the present invention provides an embedded universal integrated circuit card eUICC, where the eUICC may include:

a sending module, configured to send, by using a SM-SR, a download request generated by the eUICC to a SM-DP, where the download request carries a certificate for downloading a profile of the operator, an ID of the embedded universal integrated circuit card eUICC of the terminal, and addressing information of the SM-DP; and a transmission module, configured to receive the profile of the operator that is sent by the SM-DP by using the SM-SR and is corresponding to the download request, where the profile of the operator is obtained by the SM-DP according to an identity of the profile of the operator after the SM-DP verifies that the certificate that is for downloading the profile of the operator and is carried in the download request is valid.

With reference to the fifth aspect, in a first possible implementation manner of the fifth aspect, the eUICC may further include:

an acquiring module, configured to acquire the download certificate used to download the profile of the operator and the addressing information of the SM-DP that stores the profile of the operator; and a generating module, configured to generate the request for downloading the profile of the operator, where the download request carries the certificate for downloading the profile of the operator, the ID of the eUICC, and the addressing information of the SM-DP.

With reference to the first feasible implementation manner of the fifth aspect, in a second feasible implementation manner, the acquiring module includes:

a first acquiring module, configured to receive, from the terminal, the download certificate used to download the profile of the operator and the addressing information of the SM-DP that stores the profile of the operator; or a second acquiring module, configured to receive the download certificate used to download the profile of the operator and the addressing information of the SM-DP that stores the profile of the operator, where the download certificate and the addressing information are entered by a user by using an interface of software that is in the eUICC and is for downloading a profile of an operator; or a third acquiring module, configured to: log in to a network platform of the operator by using built-in application software of the eUICC; and acquire, from the network platform, the download certificate used to download the profile of the operator and the addressing information of the SM-DP that stores the profile of the operator.

With reference to the fifth aspect, in a third feasible implementation manner, the sending module is specifically configured to send the generated download request to an SM-SR with which the eUICC registers, where the download request carries the certificate for downloading the profile of the operator, the ID of the embedded universal integrated circuit card eUICC of the terminal, and the addressing information of the SM-DP, so that after finding the SM-DP according to the addressing information of the SM-DP, the SM-SR forwards, to the SM-DP, the download request that includes the certificate for downloading the profile of the operator and the ID of the eUICC.

With reference to the fifth aspect, in a fourth feasible implementation manner, the transmission module is further configured to receive, from the terminal, a command of requesting or instructing the eUICC to generate the request for downloading the profile of the operator.

With reference to any one of the fifth aspect to the fourth feasible implementation manner of the fifth aspect, in a fifth feasible implementation manner, the certificate for downloading the profile of the operator is a randomly generated sequence code; or the certificate for downloading the profile of the operator is a string of encoded data generated by encrypting metadata of the operator, where the metadata is extracted from the profile of the operator.

With reference to the fifth feasible implementation manner of the fifth aspect, in a sixth feasible implementation manner, when the download request includes the SM-DP, the SM-DP is carried in the randomly generated sequence code or the encoded data.

With reference to any one of the fifth aspect to the fourth feasible implementation manner of the fifth aspect, in a seventh feasible implementation manner, the download request sent by the sending module further carries the identity of the profile of the operator, and the identity of the profile of the operator is a part of the download certificate or is independent of the download certificate; and the SM-DP specifically obtains the profile of the operator according to the identity that is of the profile of the operator and is carried in the download request.

It can be learned from above that, in some feasible implementation manners of the present invention, a request for downloading a profile of an operator is initiated by an eUICC of a terminal in this embodiment of the present invention, which avoids a case in which the operator needs to know, in advance, identity information of the eUICC of the terminal that needs to download the profile of the operator. In addition, in this embodiment of the present invention, an SM-DP verifies whether a download certificate in the download request is valid to determine whether the initiated download request is valid, without verifying whether an object that initiates the download request is valid any longer; moreover, the download certificate may be obtained by the terminal before the terminal initiates the download request. Therefore, the terminal can acquire the certificate for downloading the profile of the operator, provided that the terminal needs to download the profile of the operator into the eUICC of the terminal. That is, in this embodiment of the present invention, a range of objects that can download the profile of the operator may be extended to all eUICCs. In addition, in this embodiment of the present invention, because the request for downloading the profile of the operator is initiated by the terminal, an end user certainly can freely select an opportunity for downloading the profile of the operator.

A sixth aspect of the present invention provides a SM-DP, where the SM-DP may include:

a receiving module, configured to receive, from a terminal or an embedded universal integrated circuit card eUICC of the terminal, a request that is for downloading a profile of an operator and is forwarded by a SM-SR, where the download request carries an ID of the eUICC and a certificate for downloading the profile of the operator;

a profile management module, configured to: after verifying that the certificate that is for downloading the profile of the operator and is carried in the download request is valid, acquire, according to an identity of the profile of the operator, the profile of the operator that is stored in the SM-DP and is corresponding to the download request; and a sending module, configured to send, by using the SM-SR, the acquired profile that is of the operator and is corresponding to the download request to the eUICC.

With reference to the sixth aspect, in a first feasible implementation manner, the receiving module is further configured to receive and store the certificate for downloading the profile of the operator and the identity of the profile of the operator, where the download certificate and the identity are generated by the operator; or the SM-DP further includes:

a generating module, configured to generate and store, according to a request of the operator, the certificate for downloading the profile of the operator and the identity of the profile of the operator.

With reference to the sixth aspect or the first feasible implementation manner of the sixth aspect, in a second feasible implementation manner, the certificate for downloading the profile of the operator is a randomly generated sequence code, and when verifying that a sequence code that is carried in the download request and is used as the download certificate is the same as a sequence code stored in the SM-DP, the profile management module determines that the certificate that is for downloading the profile of the operator and is carried in the download request is valid.

With reference to the sixth aspect or the first feasible implementation manner of the sixth aspect, in a third feasible implementation manner, the certificate for downloading the profile of the operator is a string of encoded data generated by encrypting the ICC ID, and when metadata obtained after the profile management module decodes, according to a locally stored decryption key, encoded data carried in the download request is the same as metadata that is of the profile of the operator and is stored in the SM-DP, the profile management module determines that the certificate that is for downloading the profile of the operator and is carried in the download request is valid.

With reference to the sixth aspect or the first feasible implementation manner of the sixth aspect, in a fourth feasible implementation manner, the download request received by the receiving module further carries the identity of the profile of the operator, and the identity of the profile of the operator is a part of the download certificate or is independent of the download certificate; and the profile management module specifically obtains the profile of the operator according to the identity that is of the profile of the operator and is carried in the download request.

It can be teamed from above that, in some feasible implementation manners of the present invention, a SM-DP receives, from a terminal or an embedded universal integrated circuit card eUICC of the terminal, a request that is for downloading a profile of an operator and is forwarded by a SM-SR, where the download request carries an ID of the eUICC and a certificate for downloading the profile of the operator; after verifying that the certificate that is for downloading the profile of the operator and is carried in the download request is valid, the SM-DP acquires, according to an identity of the profile of the operator, the profile of the operator that is stored in the SM-DP and is corresponding to the download request; and the SM-DP sends, by using the SM-SR, the profile that is of the operator and is corresponding to the download request to the eUICC. In this embodiment of the present invention, a request for downloading a profile of an operator is initiated by a terminal side (a terminal or an eUICC of a terminal), thereby avoiding a case in which the operator needs to know, in advance, identity information of the eUICC of the terminal that needs to download the profile of the operator. In addition, in this embodiment of the present invention, an SM-DP verifies whether a download certificate in the download request is valid to determine whether the initiated download request is valid, without verifying whether an object that initiates the download request is valid any longer; moreover, the download certificate may be obtained by the terminal before the terminal initiates the download request. Therefore, the terminal can acquire the certificate for downloading the profile of the operator, provided that the terminal needs to download the profile of the operator into the eUICC of the terminal. That is, in this embodiment of the present invention, a range of objects that can download the profile of the operator may be extended to all eUICCs. In addition, in this embodiment of the present invention, because the request for downloading the profile of the operator is initiated by the terminal, an end user certainly can freely select an opportunity for downloading the profile of the operator.

DESCRIPTION OF EMBODIMENTS

To make the objectives, technical solutions, and advantages of the present invention clearer, the following further describes the present invention in detail with reference to the accompanying drawings.

Figure 1:
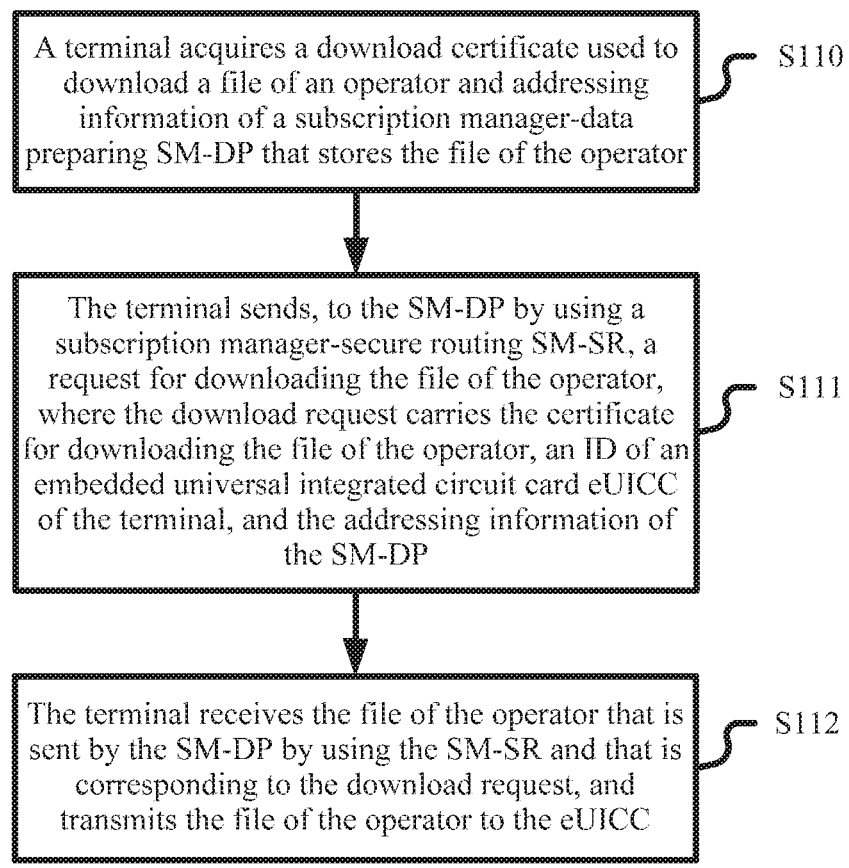
FIG. 1 is a schematic flowchart of a method for downloading a profile of an operator according to a first embodiment of the present invention.

FIG. 1 is a schematic flowchart of a method for downloading a profile of an operator according to a first embodiment of the present invention. As shown in FIG. 1, the method may include the following steps:

Step S110: A terminal acquires a download certificate used to download a profile of an operator and addressing information of a SM-DP that stores the profile of the operator, where the address information is used to find the SM-DP.

In specific implementation, the method for downloading a pro file of an operator in the present invention may be executed from step S111, and step S110 may be a pre-step. That is, it is unnecessary to execute step S110 each time before a profile of an operator is downloaded.

In specific implementation, before step S110, the operator (for example, an MNO) may entrust the SM-DP to generate the profile of the operator. The profile may include subscription data that is of the operator and is needed for accessing a network of the operator, such as an international mobile subscriber identity (IMSI), a Ki (16-byte key data generated by a card manufacturer), a parameter required in an encryption algorithm. The profile may further include installation or revision packages of various applications, for example, may include an installation package of Fetion and an update package of QQ. Optionally, similar to the prior art, the operator may further limit, by using the SM-DP, a terminal that can download the profile of the operator. For example, the operator may store, in the SM-DP, an identity of the terminal that can download the profile of the operator or a classification identity of the terminal.

In specific implementation, the addressing information of the SM-DP may include information such as an identity of the SM-DP (for example, an ID of the SM-DP) or an address of the SM-DP, where the identity uniquely identifies the SM-DP.

In specific implementation, before step S110, the operator (for example, an MNO) may further generate or entrust the SM-DP to generate information such as the certificate for downloading the profile of the operator and an identity of the profile of the operator. In specific implementation, the identity of the profile of the operator may be an ICCID or any other identity that can uniquely identify the profile of the operator. In this case, in step S110, the terminal may further acquire information such as the identity of the profile of the operator.

In specific implementation, in step S110, the terminal may acquire, in multiple ways, information such as the download certificate used to download the profile of the operator, the addressing information of the SM-DP that stores the profile of the operator, and the identity of the profile of the operator, where these ways include but are not limited to:

The terminal logs in to a network platform of the operator by using built-in application software of the terminal, and acquires, from the network platform, the information such as the download certificate used to download the profile of the operator, the addressing information of the SM-DP that stores the profile of the operator, and the identity of the profile of the operator.

Alternatively, the terminal receives the information such as the download certificate used to download the profile of the operator, the addressing information of the SM-DP that stores the profile of the operator, and the identity of the profile of the operator, where the information is manually entered by a user. In the manner, the user may acquire, in multiple ways, the download certificate used to download the profile of the operator and the addressing information of the SM-DP that stores the profile of the operator. For example, the user may purchase a dedicated information card, and acquire, by dialing a particular phone number on the information card or entering a particular verification code on the information card, the download certificate used to download the profile of the operator and the addressing information of the SM-DP that stores the profile of the operator; or the user may directly read, from a purchased information card, the download certificate used to download the profile of the operator and the addressing information of the SM-DP that stores the profile of the operator. For another example, the user may further directly go to a retail store or a business hall of the operator, and acquire, from a customer service representative of the operator, the download certificate used to download the profile of the operator and the addressing information of the SM-DP that stores the profile of the operator. For another example, the end user may further log in to a network platform of the operator by using built-in application software of a device except the terminal, and acquire, from the network platform, the download certificate used to download the profile of the operator and the addressing information of the SM-DP that stores the profile of the operator.

Alternatively, the terminal acquires, by scanning a two-dimensional code, the information such as the download certificate used to download the profile of the operator, the addressing information of the SM-DP that stores the profile of the operator, and the identity of the profile of the operator.

In specific implementation, in this embodiment of the present invention, the certificate for downloading the profile of the operator is uniquely corresponding to the profile of the operator, and is used as a unique certificate for downloading the profile of the operator. In specific implementation, the download certificate may be in various forms, which include but are not limited to:

The certificate for downloading the profile of the operator is a randomly generated sequence code.

Alternatively, the certificate for downloading the profile of the operator is a string of encoded data generated by encrypting metadata of the profile of the operator. A manner of the encryption may be one of various existing encryption manners, and a form of the encoded data may be an ordinary binary code, or may be a two-dimensional code or the like.

The metadata may be extracted from the profile of the operator. For example, the metadata may be an ICCID. Step S111: The terminal sends, to the SM-DP by using a SM-SR, a request for downloading the profile of the operator, where the download request carries the certificate for downloading the profile of the operator, an ID of an embedded universal integrated circuit card eUICC of the terminal, and the addressing information of the SM-DP.

In specific implementation, optionally, the download request may further include the identity of the profile of the operator.

Optionally, the addressing information of the SM-DP may be further carried in the download certificate of the download request, for example, carried in the randomly generated sequence code, or carried in the string of encoded data generated by encrypting the metadata. In this case, the SM-SR may be notified, in advance, of a method for acquiring the addressing information of the SM-DP from the download certificate; for example, the SM-SR may be notified of a location that is of the addressing information of the SM-DP and is in the download certificate or a decryption method.

Optionally, the download request may further include information such as an identity of the terminal or a classification identity of the terminal.

In specific implementation, in step S111, the terminal specifically sends, to an SM-SR with which the eUICC registers, the request for downloading the profile of the operator, where the download request carries the certificate for downloading the profile of the operator, the ID of the embedded universal integrated circuit card eUICC of the terminal, and the addressing information of the SM-DP, so that after finding the SM-DP according to the addressing information of the SM-DP, the SM-SR forwards, to the SM-DP, the download request that includes the certificate for downloading the profile of the operator and the ID of the eUICC. Optionally, the forwarded request may also include information such as the identity of the profile of the operator and the identity of the terminal or the classification identity of the terminal.

In specific implementation, before the terminal sends, to the SM-SR with which the eUICC registers, the request for downloading the profile of the operator, the eUICC of the terminal and the SM-SR need to perform bidirectional authentication. Similarly, before the SM-SR forwards the download request to the SM-DP, the SM-SR and the SM-DP also need to perform bidirectional authentication, and the SM-SR may verify whether a profile conflicting with the profile of the operator that is currently requested to download has already been downloaded into the eUICC (for example, a mobile on-net user of a mobile operator can access only a mobile network, and cannot access a telecommunications network; in this case, if an eUICC of a mobile terminal requests to download a profile of a telecommunications operator, even though the eUICC acquires information such as an SM-DP and a certificate for downloading the profile of the telecommunications operator, the eUICC cannot download the profile of the operator due to a profile restriction policy of the operator); if there is a conflicitmg file, the SM-SR may stop a procedure such as forwarding the request that is for downloading the profile of the operator and is sent by the terminal. All mentioned above are similar to those in the prior art, and details are not described herein again.

In specific implementation, in step S111, the download request sent by the terminal may be generated by the terminal, or may be generated by the eUICC of the terminal.

When the download request sent by the terminal is generated by the terminal, after step S110 and before step S111, the method in this embodiment of the present invention may further include the following steps (not shown in the figure):

S10. The terminal reads, from the eUICC, the ID of the eUICC and addressing information of an SM-SR with which the eUICC registers, and finds the SM-SR according to the addressing information, where the ID of the eUICC is used to notify the SM-DP of an eUICC into which the profile of the operator needs to be downloaded; the addressing information of the SM-SR is used to enable the terminal to find the SM-SR that is used to forward the request for downloading the profile of the operator, so as to forward, to the SM-DP by using the SM-SR, the request for downloading the profile of the operator, and the addressing information of the SM-SR may include an identity or address of the SM-SR.

In specific implementation, in S10, the terminal may read, by using an application protocol data unit (Application Protocol Data Unit, APDU) message, such as a READ RECORD command, the ID of the eUICC and the addressing information of the SM-SR with which the eUICC registers.

S11. The terminal generates the request for downloading the profile of the operator, where the download request carries the certificate for downloading the profile of the operator, the ID of the eUICC of the terminal, and the addressing information of the SM-DP. Optionally, the generated download request may further include the information such as the identity of the profile of the operator, the identity of the terminal, or the classification identity of the terminal.

In this case, in this embodiment of the present invention, the request for downloading the profile of the operator is actually generated by the terminal, the terminal serves as an initiator of the request for downloading the profile of the operator, and the download request does not pass through the eUICC into which the profile of the operator really needs to be downloaded.

When the download request sent by the terminal is generated by the eUICC of the terminal, after step S110 and before step S111, the method in this embodiment of the present invention may further include the following steps (not shown in the figure):

S20. The terminal sends, to the eUICC, the acquired download certificate used to download the profile of the operator and the acquired addressing information of the SM-DP that stores the profile of the operator. Optionally, in S20, the terminal may further send, to the eUICC, the identity of the profile of the operator and the identity of the terminal or the classification identity of the terminal.

In specific implementation, in S20, similarly, the terminal may send, to the eUICC by using an APDU message, the acquired download certificate used to download the profile of the operator and the acquired addressing information of the SM-DP that stores the profile of the operator. For example, in this embodiment of the present invention, an INSTALL command defined in an existing global platform card specification (Global Platform Card Specification, GPCS) may be extended, and a DATA field of the INSTALL command carries the download certificate used to download the profile of the operator, the addressing information of the SM-DP that stores the profile of the operator, the identity of the profile of the operator, the identity of the terminal or the classification identity of the terminal, and the like.

Optionally, in specific implementation, when or after sending, to the eUICC, the acquired download certificate used to download the profile of the operator and the acquired addressing information of the SM-DP that stores the profile of the operator, the terminal may further send, to the eUICC, a command of requesting or instructing the eUICC to generate and send the request for downloading the profile of the operator. For example, the terminal may add a dedicated character or code to the INSTALL command and use the dedicated character or code as a message of requesting the eUICC to generate and send the request for downloading the profile of the operator. For example, a new code is set for the INSTALL command, and the new code is carried in a P1 field of the INSTALL command to indicate that the INSTALL command is the command of requesting or instructing the eUICC to generate and send the request for downloading the profile of the operator.

S21. The terminal receives, from the eUICC, the request that is for downloading the profile of the operator and is generated by the eUICC, where the download request carries the certificate for downloading the profile of the operator, the ID of the eUICC of the terminal, and the addressing information of the SM-DP.

In specific implementation, in S21, similarly, the terminal may receive, from the eUICC by using an APDU message, the request that is for downloading the profile of the operator and is generated by the eUICC. For example, in this embodiment of the present invention, an INSTALL command defined in an existing global platform card specification (Global Platform Card Specification, GPCS) may be extended, and a DATA field of the INSTALL command carries the download certificate used to download the profile of the operator, the addressing information of the SM-DP that stores the profile of the operator, the identity of the profile of the operator, the identity of the terminal or the classification identity of the terminal, and the like, where the download certificate, the addressing information, the identity of the profile of the operator, the identity of the terminal or the classification identity of the terminal, and the like are in the download request.

In this case, in this embodiment of the present invention, the request for downloading the profile of the operator is actually generated by the eUICC, the eUICC serves as an initiator of the request for downloading the profile of the operator, and the terminal provides a function of transparently transmitting the request that is for downloading the profile of the operator and is generated by the eUICC.

Step S112: The terminal receives the profile of the operator that is sent by the SM-DP by using the SM-SR and that is corresponding to the download request, and transmits the profile of the operator to the eUICC, where the profile of the operator is obtained by the SM-DP according to an identity of the profile of the operator after the SM-DP verifies that the certificate that is for downloading the profile of the operator and is carried in the download request is valid.

In specific implementation, because download certificates are different, manners in which the SM-DP verifies that the certificate that is for downloading the profile of the operator and is carried in the download request is valid are also different.

For example, when the certificate for downloading the profile of the operator is a randomly generated sequence code, and when verifying that a sequence code that is carried in the download request and is used as the download certificate is the same as a sequence code stored in the SM-DP, the SM-DP determines that the certificate that is for downloading the profile of the operator and is carried in the download request is valid.

Alternatively, when the certificate for downloading the profile of the operator is a string of encoded data generated by encrypting metadata of the operator, and when metadata obtained after the SM-DP decodes, according to a locally stored decryption key, encoded data carried in the download request is the same as metadata that is of the profile of the operator and is stored in the SM-DP, the SM-DP determines that the certificate that is for downloading the profile of the operator and is carried in the download request is valid.

In specific implementation, when the download request further carries the identity of the profile of the operator, and the identity of the profile of the operator is a part of the download certificate or is independent of the download certificate, the SM-DP specifically obtains the profile of the operator according to the identity that is of the profile of the operator and is carried in the download request.

Certainly, in specific implementation, the SM-DP may further acquire index information according to the identity that is of the profile of the operator and is locally stored in the SM-DP, locally search the SM-DP for the identity of the profile of the operator, and acquire the profile of the operator according to the found identity of the profile of the operator.

Optionally, when the download request includes the information such as the identity of the terminal or the Classification identity of the terminal, only after verifying that the certificate that is for downloading the profile of the operator and is carried in the download request is valid, and verifying that the identity of the terminal is an identity of an authorized terminal or that the classification identity of the terminal is a classification identity of an authorized terminal, the SM-DP can acquire, according to the identity of the profile of the operator, the profile of the operator that is stored in the SM-DP and is corresponding to the download request.

It can be learned from above that, in some feasible implementation manners of the present invention, a request for downloading a profile of an operator is initiated by a terminal in this embodiment of the present invention, which avoids a case in which the operator needs to know, in advance, identity information of an eUICC of the terminal that needs to download the profile of the operator. In addition, in this embodiment of the present invention, an SM-DP verifies whether a download certificate in the download request is valid to determine whether the initiated download request is valid, without verifying whether an object that initiates the download request is valid any longer; moreover, the download certificate may be obtained by the terminal before the terminal initiates the download request. Therefore, the terminal can acquire the certificate for downloading the profile of the operator, provided that the terminal needs to download the profile of the operator into the eUICC of the terminal. That is, in this embodiment of the present invention, a range of objects that can download the profile of the operator may be extended to all eUICCs. In addition, in this embodiment of the present invention, because the request for downloading the profile of the operator is initiated by the terminal, an end user certainly can freely select an opportunity for downloading the profile of the operator.

Figure 2:
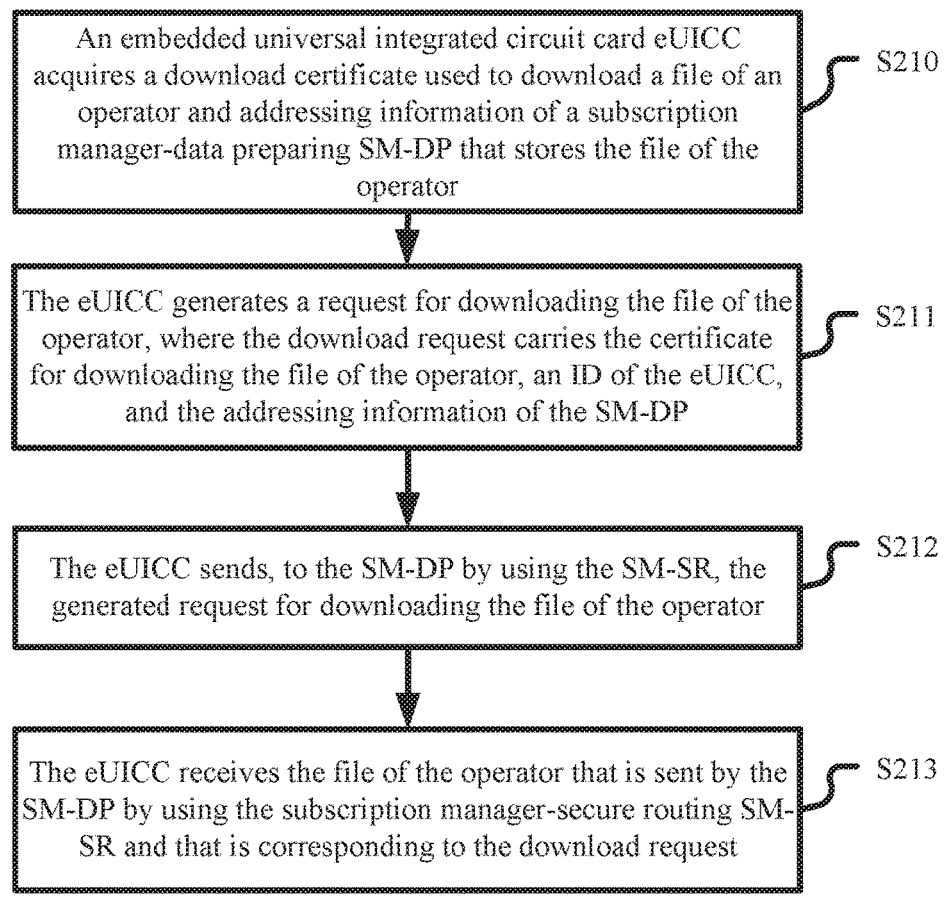
FIG. 2 is a schematic flowchart of a method for downloading a profile of an operator according to a second embodiment of the present invention.

FIG. 2 is a schematic flowchart of a method for downloading a profile of an operator according to a second embodiment of the present invention. As shown in FIG. 2, the method may include the following steps:

Step S210: An embedded universal integrated circuit card eUICC acquires a download certificate used to download a profile of an operator and addressing information of a SM-DP that stores the profile of the operator.

In specific implementation, before step S210, the operator (for example, an MNO) may entrust the SM-DP to generate the profile of the operator (which is generally referred to as a profile of the operator for short). The profile may include subscription data that is of the operator and is needed for accessing a network of the operator, such as an international mobile subscriber identity (International Mobile Subscriber Identification Number, IMSI), a Ki (16-byte key data generated by a card manufacturer), a parameter required in an encryption algorithm. The profile may further include installation or revision packages of various applications, for example, may include an installation package of Fetion and an update package of QQ. Optionally, similar to the prior art, the operator may further limit, by using the SM-DP a terminal that can download the profile of the operator. For example, the operator may store, in the SM-DP, an identity of the terminal that can download the profile of the operator or a classification identity of the terminal.

In specific implementation, the addressing information of the SM-DP may include information such as an identity or address of the SM-DP, where the identity uniquely identifies the SM-DP.

In specific implementation, before step S210, the operator (for example, an MNO) may further generate or entrust the SM-DP to generate information such as the certificate for downloading the profile of the operator and an identity of the profile of the operator. In specific implementation, the identity of the profile of the operator may be an ICCID or any other identity that can uniquely identify the profile of the operator. In this case, in step S210, the eUICC may further acquire information such as the identity of the profile of the operator and an identity of a terminal or a classification identity of the terminal.

In specific implementation, in step S210, the eUICC may acquire, in multiple ways, information such as the download certificate used to download the profile of the operator, the addressing information of the SM-DP that stores the profile of the operator, and the identity of the profile of the operator, where these ways include but are not limited to:

The eUICC receives, from the terminal, the information such as the download certificate used to download the profile of the operator, the addressing information of the SM-DP that stores the profile of the operator, and the identity of the profile of the operator.

In specific implementation, the eUICC may receive, from the terminal by using an APDU message, the information such as the download certificate used to download the profile of the operator, the addressing information of the SM-DP that stores the profile of the operator, and the identity of the profile of the operator. For example, in this embodiment of the present invention, an INSTALL command defined in an existing global platform card specification (Global Platform Card Specification, GPCS) may be extended, and a DATA field of the INSTALL command carries the information such as the download certificate used to download the profile of the operator, the addressing information of the SM-DP that stores the profile of the operator, and the identity of the profile of the operator.

Alternatively, the eUICC receives the download certificate used to download the profile of the operator and the addressing information of the SM-DP that stores the profile of the operator, where the download certificate and the addressing information are entered by a user by using an interface of software (for example, SIM application toolkit (SIM application toolkit, SAT) software) that is in the eUICC and is for downloading a profile of an operator. In the manner, the user may acquire, in multiple ways, the information such as the download certificate used to download the profile of the operator, the addressing information of the SM-DP that stores the profile of the operator, and the identity of the profile of the operator. For example, the user may purchase a dedicated information card, and acquire, by dialing a particular phone number on the information card or entering a particular verification code on the information card, the download certificate used to download the profile of the operator and the addressing information of the SM-DP that stores the profile of the operator or the user may directly read, from a purchased information card, the download certificate used to download the profile of the operator and the addressing information of the SM-DP that stores the profile of the operator. For another example, the user may further directly go to a retail store or a business hall of the operator, and acquire, from a customer service representative of the operator, the download certificate used to download the profile of the operator and the addressing information of the SM-DP that stores the profile of the operator. For another example, the end user may further log in to a network platform of the operator by using built-in application software of a device except the terminal, and acquire, from the network platform, the download certificate used to download the profile of the operator and the addressing information of the SM-DP that stores the profile of the operator.

Alternatively, the eUICC logs in to a network platform of the operator by using built-in application software of the eUICC, and acquires, from the network platform, the information such as the download certificate used to download the profile of the operator, the addressing information of the SM-DP that stores the profile of the operator, and the identity of the profile of the operator.

In specific implementation, in this embodiment of the present invention, the certificate for downloading the profile of the operator is uniquely corresponding to the profile of the operator, and is used as a unique certificate for downloading the profile of the operator. In specific implementation, the download certificate may be in various forms, which include but are not limited to:

The certificate for downloading the profile of the operator is a randomly generated sequence code.

Alternatively, the certificate for downloading the profile of the operator is a string of encoded data generated by encrypting metadata of the profile of the operator. A manner of the encryption may be one of various existing encryption manners, and a form of the encoded data may be an ordinary binary code, or may be a two-dimensional code or the like. The metadata may be extracted from the profile of the operator. For example, the metadata may be an ICCID.

Step S211: The eUICC generates a request for downloading the profile of the operator, where the download request carries the certificate for downloading the profile of the operator, an ID of the eUICC, and the addressing information of the SM-DP.

Optionally, the download request in step S211 may further include information such as the identity of profile of the operator, the terminal identity of the terminal, or the classification identity of the terminal.

Optionally, the addressing information of the SM-DP may be further carried in the download certificate of the download request, for example, carried in the randomly generated sequence code, or carried in the string of encoded data generated by encrypting the metadata. In this case, the SM-SR may be notified, in advance, of a method for acquiring the addressing information of the SM-DP from the download certificate for example, the SM-SR may be notified of a location that is of the addressing information of the SM-DP and is in the download certificate or a decryption method.

In specific implementation, before step S211, the eUICC may further receive, from the terminal, a command of requesting or instructing the eUICC to generate the request for downloading the profile of the operator. Alternatively, the eUICC may further receive a command of requesting or instructing the eUICC to generate the request for downloading the profile of the operator, where the command is entered by the user or sent by another device. In specific implementation, similarly, the terminal may send the command by using an APDU message; for example, the terminal may extend an INSTALL command defined in a GPCS, and a dedicated character or code is added to the INSTALL command and is used as the command of requesting the eUICC to generate and send the request for downloading the profile of the operator. For example, a new code is set for the INSTALL command, and the new code is carried in a P1 field of the INSTALL command to indicate that the INSTALL command is the command of requesting or instructing the eUICC to generate and send the request for downloading the profile of the operator.

Step S212: The eUICC sends, to the SM-DP by using the SM-SR, the generated request for downloading the profile of the operator.

Similarly, in specific implementation, the method in the second embodiment of the present invention may be executed from step S212, and steps S210 and S211 may be pre-steps. That is, it is unnecessary to execute steps S210 and S211 each time before a profile of an operator is downloaded. In specific implementation, in step S2.12, the eUICC specifically sends, to an SM-SR with which the eUICC registers, the request for downloading the profile of the operator, where the download request carries the certificate for downloading the profile of the operator, the ID of the embedded universal integrated circuit card eUICC of the terminal, and the addressing information of the SM-DP, so that after finding the SM-DP according to the addressing information of the SM-DP, the SM-SR forwards, to the SM-DP, the download request that includes the certificate for downloading the profile of the operator and the ID of the eUICC. Optionally, the forwarded request may also include the information such as the identity of the profile of the operator and the identity of the terminal or the classification identity of the terminal.

In specific implementation, before the eUICC sends, to the SM-SR with which the eUICC registers, the request for downloading the profile of the operator, the eUICC and the SM-SR need to perform bidirectional authentication. Similarly, before the SM-SR forwards the download request to the SM-DP, the SM-SR and the SM-DP also need to perform bidirectional authentication, and the SM-SR may verify whether a profile conflicting with the profile of the operator that is currently requested to download has already been downloaded into the eUICC (for example, a mobile on-net user of a mobile operator can access only a mobile network, and cannot access a telecommunications network; in this case, if an eUICC of a mobile terminal requests to download a profile of a telecommunications operator, even though the eUICC acquires information such as an SM-DP and a certificate for downloading the profile of the telecommunications operator, the eUICC cannot download the profile of the operator due to a profile restriction policy of the operator); if there is a conflicting file, the SM-SR may stop a procedure such as forwarding the request that is for downloading the profile of the operator and is sent by the eUICC.

All mentioned above are similar to those in the prior art, and details are not described herein again.

Step S213: The eUICC receives the profile of the operator that is sent by the SM-DP by using the SM-SR and that is corresponding to the download request, where the profile of the operator is obtained by the SM-DP according to an identity of the profile of the operator after the SM-DP verifies that the certificate that is for downloading the profile of the operator and is carried in the download request is valid.

In specific implementation, because download certificates are different, manners in which the SM-DP verifies that the certificate that is for downloading the profile of the operator and is carried in the download request is valid are also different.

For example, when the certificate for downloading the profile of the operator is a randomly generated sequence code, and when verifying that a sequence code that is carried in the download request and is used as the download certificate is the same as a sequence code stored in the SM-DP, the SM-DP determines that the certificate that is for downloading the profile of the operator and is carried in the download request is valid.

Alternatively, when the certificate for downloading the profile of the operator is a string of encoded data generated by encrypting metadata of the operator, and when metadata obtained after the SM-DP decodes, according to a locally stored decryption key, encoded data carried in the download request is the same as metadata that is of the profile of the operator and is stored in the SM-DP, the SM-DP determines that the certificate that is for downloading the profile of the operator and is carried in the download request is valid.

In specific implementation, when the download request further carries the identity of the profile of the operator, and the identity of the profile of the operator is a part of the download certificate or is independent of the download certificate, the SM-DP specifically obtains the profile of the operator according to the identity that is of the profile of the operator and is carried in the download request.

Certainly, in specific implementation, the SM-DP may further acquire index information according to the identity that is of the profile of the operator and is locally stored in the SM-DP, locally search the SM-DP for the identity of the profile of the operator, and acquire the profile of the operator according to the found identity of the profile of the operator.

Optionally, when the download request includes information such as the identity of the terminal or the classification identity of the terminal, only after verifying that the certificate that is for downloading the profile of the operator and is carried in the download request is valid, and verifying that the identity of the terminal is an identity of an authorized terminal or that the classification identity of the terminal is a classification identity of an authorized terminal, the SM-DP can acquire, according to the identity of the profile of the operator, the profile of the operator that is stored in the SM-DP and is corresponding to the download request.

In this embodiment, a manner embodiment of downloading a profile of an operator in the embodiments of the present invention is described from an eUICC side by using examples. When a request for downloading a profile of an operator is initiated by an eUICC, a terminal provides a function of transparently transmitting the request that is for downloading the profile of the operator and is generated by the eUICC.

It can be learned from above that, in some feasible implementation manners of the present invention, a request for downloading a profile of an operator is initiated by an eUICC of a terminal in this embodiment of the present invention, which avoids a case in which the operator needs to know, in advance, identity information of the eUICC of the terminal that needs to download the profile of the operator. In addition, in this embodiment of the present invention, an SM-DP verifies whether a download certificate in the download request is valid to determine whether the initiated download request is valid, without verifying whether an object that initiates the download request is valid any longer; moreover, the download certificate may be obtained by the terminal before the terminal initiates the download request. Therefore, the terminal can acquire the certificate for downloading the profile of the operator, provided that the terminal needs to download the profile of the operator into the eUICC of the terminal. That is, in this embodiment of the present invention, a range of objects that can download the profile of the operator may be extended to all eUICCs. In addition, in this embodiment of the present invention, because the request for downloading the profile of the operator is initiated by the terminal, an end user certainly can freely select an opportunity for downloading the profile of the operator.

Figure 3:
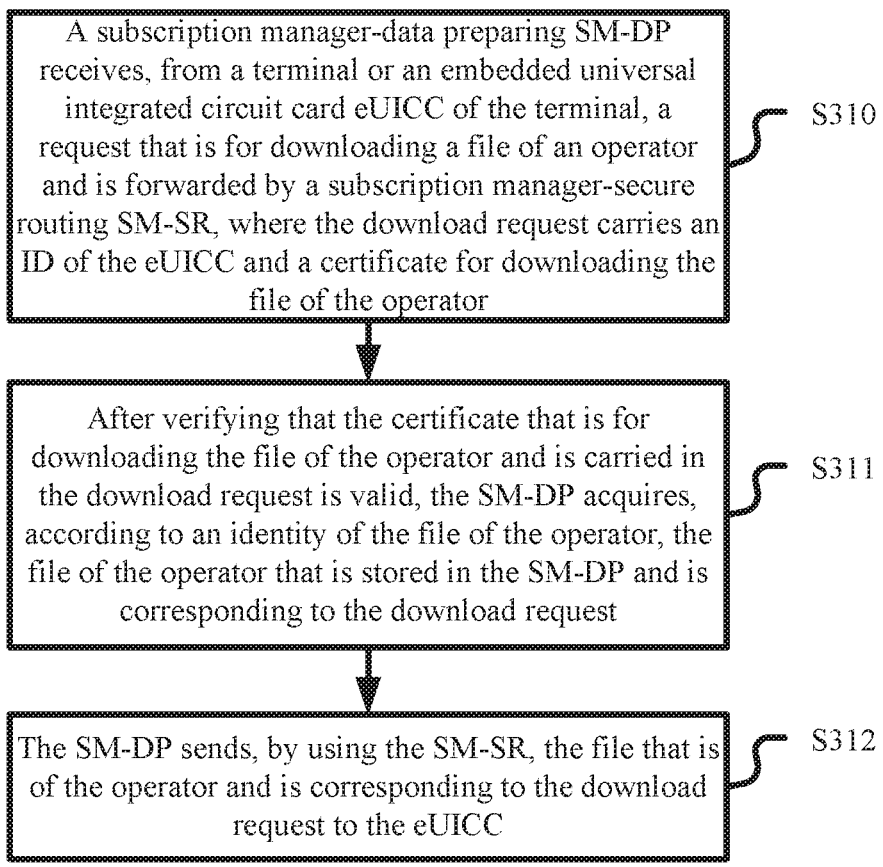
FIG. 3 is a schematic flowchart of a method for downloading a profile of an operator according to a third embodiment of the present invention.

FIG. 3 is a schematic flowchart of a method for downloading a profile of an operator according to a third embodiment of the present invention. As shown in FIG. 3, the method may include the following steps:

Step S310: A SM-DP receives, from a terminal or an embedded universal integrated circuit card eUICC of the terminal, a request that is for downloading a profile of an operator and is forwarded by a SM-SR, where the download request carries an ID of the eUICC and a certificate for downloading the profile of the operator.

In specific implementation, in this embodiment of the present invention, the terminal or the eUICC of the terminal may serve as an initiator of the download request, that is, the request for downloading the profile of the operator may be from the terminal or the eUICC.

When the terminal serves as the initiator of the download request, the terminal reads, from the eUICC, the ID of the eUICC and addressing information of the SM-SR, where the addressing information is used to find the SM-SR, the addressing information may include an identity or address of the SM-SR, and the identity may uniquely identify the SM-SR. Then, the terminal generates the request for downloading the profile of the operator, and sends the download request. In this case, in this embodiment of the present invention, when the download request is sent, the download request may not pass through the eUICC into which the profile of the operator really needs to be downloaded.

When the eUICC of the terminal serves as the initiator of the download request, the eUICC sends the generated download request to the terminal, and sends the generated download request to the SM-SR by using the terminal. In this case, the terminal provides a function of transparently transmitting the request that is for downloading the profile of the operator and is generated by the eUICC.

In specific implementation, before step S310, the operator (for example, an MNO) may entrust the SM-DP to generate the profile of the operator (which is generally referred to as a profile of the operator for short). The profile may include subscription data that is of the operator and is needed for accessing a network of the operator, such as an international mobile subscriber identity (International Mobile Subscriber Identification Number, IMSI), a Ki (16-byte key data generated by a card manufacturer), a parameter required in an encryption algorithm. The profile may further include installation or revision packages of various applications, for example, may include an installation package of Fetion and an update package of QQ. Optionally, similar to the prior art, the operator may further limit, by using the SM-DP, a terminal that can download the profile of the operator. For example, the operator may store, in the SM-DP, an identity of the terminal that can download the profile of the operator or a classification identity of the terminal.

In specific implementation, the addressing information of the SM-DP may include information such as an identity or address of the SM-DP, where the identity uniquely identifies the SM-DP.

In specific implementation, before step S310, the operator (for example, an MNO) may further generate or entrust the SM-DP to generate information such as the certificate for downloading the profile of the operator and an identity of the profile of the operator. In specific implementation, the identity of the profile of the operator may be an ICCID or any other identity that can uniquely identify the profile of the operator. Optionally, the download request received in step S310 in this embodiment of the present invention may further include information such as the identity of the profile of the operator, an identity of the terminal, or a classification identity of the terminal.

Step S311: After verifying that the certificate that is for downloading the profile of the operator and is carried in the download request is valid, the SM-DP acquires, according to an identity of the profile of the operator, the profile of the operator that is stored in the SM-DP and is corresponding to the download request.

In specific implementation, because download certificates are different, in step S311, manners in which the SM-DP verifies that the certificate that is for downloading the profile of the operator and is carried in the download request is valid are also different.

For example, when the certificate for downloading the profile of operator is a randomly generated sequence code, and when verifying that a sequence code that is carried in the download request and is used as the download certificate is the same as a sequence code stored in the SM-DP, the SM-DP determines that the certificate that is for downloading the profile of the operator and is carried in the download request is valid.

Alternatively, when the certificate for downloading the profile of the operator is a string of encoded data generated by encrypting metadata of the operator, and when metadata obtained after the SM-DP decodes, according to a locally stored decryption key, encoded data carried in the download request is the same as metadata that is of the profile of the operator and is stored in the SM-DP, the SM-DP determines that the certificate that is for downloading the pro file of the operator and is carried in the download request is valid.

In specific implementation, when the download request further carries the identity of the profile of the operator, and the identity of the profile of the operator is a part of the download certificate or is independent of the download certificate, the SM-DP specifically obtains the profile of the operator according to the identity that is of the profile of the operator and is carried in the download request.

Certainly, in specific implementation, the SM-DP may further acquire index information according to the identity that is of the profile of the operator and is locally stored in the SM-DP, locally search the SM-DP for the identity of the profile of the operator, and acquire the profile of the operator according to the found identity of the profile of the operator.

Optionally, when the download request includes information such as the identity of the terminal or the classification identity of the terminal, only after verifying that the certificate that is for downloading the profile of the operator and is carried in the download request is valid, and verifying that the identity of the terminal is an identity of an authorized terminal or that the classification identity of the terminal is a classification identity of an authorized terminal, the SM-DP can acquire, according to the identity of the profile of the operator, the profile of the operator that is stored in the SM-DP and is corresponding to the download request.

Step S312: The SM-DP sends, by using the SM-SR, the profile that is of the operator and is corresponding to the download request to the eUICC.

It can be learned from above that, in some feasible implementation manners of the present invention, a SM-DP receives, from a terminal or an embedded universal integrated circuit card eUICC of the terminal, a request that is for downloading a profile of an operator and is forwarded by a SM-SR, where the download request carries an ID of the eUICC and a certificate for downloading the profile of the operator; after verifying that the certificate that is for downloading the profile of the operator and is carried in the download request is valid, the SM-DP acquires, according to an identity of the profile of the operator, the profile of the operator that is stored in the SM-DP and is corresponding to the download request; and the SM-DP sends, by using the SM-SR, the profile that is of the operator and is corresponding to the download request to the eUICC. In this embodiment of the present invention, a request for downloading a profile of an operator is initiated by a terminal side (a terminal or an eUICC of a terminal), thereby avoiding a case in which the operator needs to know, in advance, identity information of the eUICC of the terminal that needs to download the profile of the operator. In addition, in this embodiment of the present invention, an SM-DP verifies whether a download certificate in the download request is valid to determine whether the initiated download request is valid, without verifying whether an object that initiates the download request is valid any longer; moreover, the download certificate may be obtained by the terminal before the terminal initiates the download request. Therefore, the terminal can acquire the certificate for downloading the profile of the operator, provided that the terminal needs to download the profile of the operator into the eUICC of the terminal. That is, in this embodiment of the present invention, a range of objects that can download the profile of the operator may be extended to all eUICCs. In addition, in this embodiment of the present invention, because the request for downloading the profile of the operator is initiated by the terminal, an end user certainly can freely select an opportunity for downloading the profile of the operator.

Embodiments of a method for downloading a profile of an operator in the embodiments of the present invention are separately described above from a terminal side, an eUICC side of a terminal, and an SM-DP side by using examples, and embodiments of devices that execute the foregoing method are further described in the following by using examples.

Figure 4:
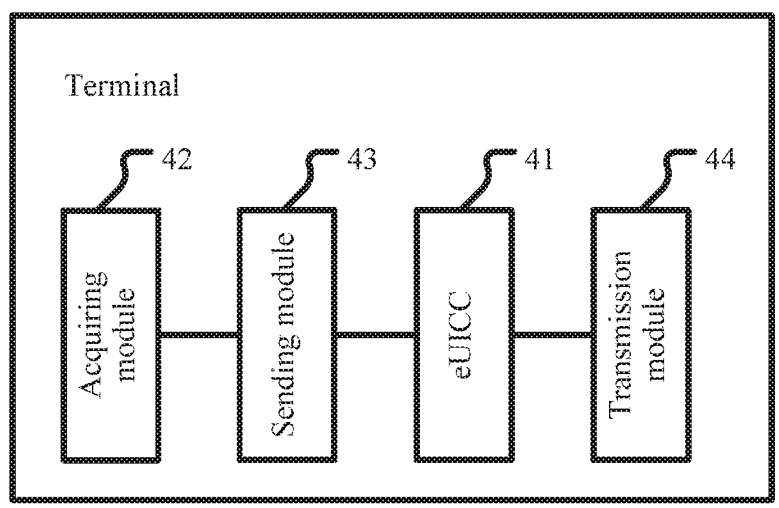
FIG. 4 is a schematic structural diagram of a terminal according to a fourth embodiment of the present invention.

FIG. 4 is a schematic structural diagram of a terminal according to a fourth embodiment of the present invention. As shown in FIG. 4, the terminal in this embodiment of the present invention include at least an embedded universal integrated circuit card eUICC 41, an acquiring module 42, a sending module 43, and a transmission module 44, where:

the eUICC 41 is configured to store a profile that is of an operator and is used by the terminal to access the operator;

the acquiring module 42 is configured to acquire a download certificate used to download the profile of the operator and addressing information of a SM-DP that stores the profile of the operator, where the address information is used to find the SM-DP;

the sending module 43 is connected to the acquiring module 42 or the eUICC 41 and is configured to send, to the SM-DP by using a SM-SR, a request for downloading the profile of the operator, where the download request carries the certificate for downloading the profile of the operator, an ID of the eUICC 41, and the addressing information of the SM-DP; and the transmission module 44 is connected to the eUICC 41 and is configured to: receive the profile of the operator that is sent by the SM-DP by using the SM-SR and is corresponding to the download request, and transmit the profile of the operator to the eUICC 41, where the profile of the operator is obtained by the SM-DP according to an identity of the profile of the operator after the SM-DP verifies that the certificate that is for downloading the profile of the operator and is carried in the download request is valid.

In specific implementation, in some other embodiments, the terminal may not include the acquiring module 42. In this case, the sending module 43 may obtain, in another way, the certificate for downloading the profile of the operator and the addressing information of the SM-DP, where the download certificate and the addressing information are in the download request.

In specific implementation, the operator (for example, an MNO) may entrust the SM-DP to generate the profile of the operator (which is generally referred to as a profile of the operator for short). The profile may include subscription data that is of the operator and is needed for accessing a network of the operator, such as an international mobile subscriber identity (International Mobile Subscriber Identification Number, IMSI), a Ki (16-byte key data generated by a card manufacturer), a parameter required in an encryption algorithm. The profile may further include installation or revision packages of various applications, for example, may include an installation package of Fetion and an update package of QQ. Optionally, similar to the prior art, the operator may further limit, by using the SM-DP, a terminal that can download the profile of the operator. For example, the operator may store, in the SM-DP, an identity of the terminal that can download the profile of the operator or a classification identity of the terminal.

In specific implementation, the addressing information of the SM-DP may include information such as an identity or address of the SM-DP, where the identity uniquely identifies the SM-DP. The operator (for example, an MNO) may further generate or entrust the SM-DP to generate information such as the certificate for downloading the profile of the operator and the identity of the profile of the operator. In specific implementation, the identity of the profile of the operator may be an ICCID or any other identity that can uniquely identify the profile of the operator. In this case the acquiring module 42 may further acquire information such as the identity of the profile of the operator.

Figure 5:
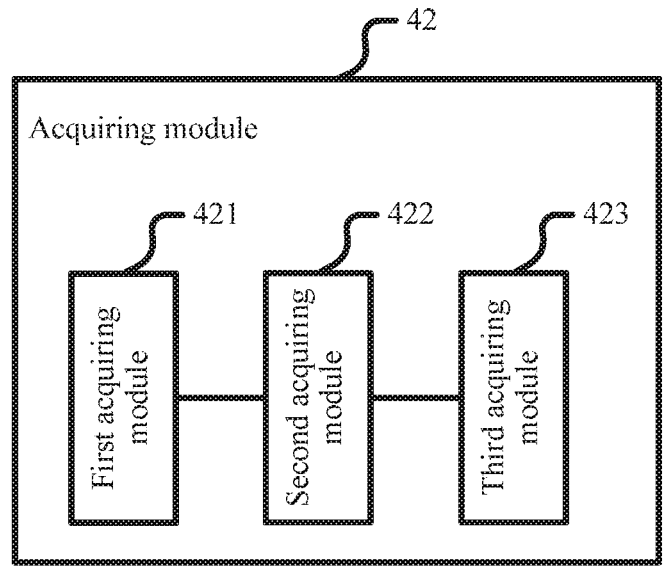
FIG. 5 is a schematic structural diagram of an acquiring module 42 according to the fourth embodiment of the present invention.

In specific implementation, the acquiring module 42 may acquire, in multiple ways, information such as the download certificate used to download the profile of the operator, the addressing information of the SM-DP that stores the profile of the operator, and the identity of the profile of the operator. In this case, as shown in FIG. 5, the acquiring module 42 in this embodiment of the present invention includes but is not limited to at least one of the following sub-modules: a first acquiring module 421, a second acquiring module 422, or a third acquiring module 423.

The first acquiring module 421 is configured to: log in to a network platform of the operator by using built-in application software of the terminal; and acquire, from the network platform, the information such as the download certificate used to download the profile of the operator, the addressing information of the SM-DP that stores the profile of the operator, and the identity of the profile of the operator.

Alternatively, the second acquiring module 422 is configured to receive the information such as the download certificate used to download the profile of the operator, the addressing information of the SM-DP that stores the profile of the operator, and the identity of the profile of the operator, where the information is manually entered by a user.

In the mariner, the user may acquire, in multiple ways, the information such as the download certificate used to download the profile of the operator, the addressing information of the SM-DP that stores the profile of the operator, and the identity of the profile of the operator. For example, the user may purchase a dedicated information card, and acquire, by dialing a particular phone number on the information card or entering a particular verification code on the information card, the information such as the download certificate used to download the profile of the operator, the addressing information of the SM-DP that stores the profile of the operator, and the identity of the profile of the operator; or the user may directly read, from a purchased information card, the information such as the download certificate used to download the profile of the operator, the addressing information of the SM-DP that stores the profile of the operator, and the identity of the profile of the operator. For another example, the user may further directly go to a retail store or a business hall of the operator, and acquire, from a customer service representative of the operator, the information such as the download certificate used to download the profile of the operator, the addressing information of the SM-DP that stores the profile of the operator, and the identity of the profile of the operator. For another example, the end user may further log in to a network platform of the operator by using built-in application software of a device except the terminal, and acquire, from the network platform, the information such as the download certificate used to download the profile of the operator, the addressing information of the SM-DP that stores the profile of the operator, and the identity of the profile of the operator.

Alternatively, the third acquiring module 423 is configured to acquire, by scanning a two-dimensional code, the information such as the download certificate used to download the profile of the operator, the addressing information of the SM-DP that stores the profile of the operator, and the identity of the profile of the operator.

In specific implementation, in this embodiment of the present invention, the certificate for downloading the profile of the operator is uniquely corresponding to the profile of the operator, and is used as a unique certificate for downloading the profile of the operator. In specific implementation, the download certificate may be in various forms, which include but are not limited to:

The certificate for downloading the profile of the operator is a randomly generated sequence code.

Alternatively, the certificate for downloading the profile of the operator is a string of encoded data generated by encrypting metadata of the profile of the operator. A manner of the encryption may be one of various existing encryption manners, and a form of the encoded data may be an ordinary binary code, or may be a two-dimensional code or the like. The metadata may be extracted from the profile of the operator. For example, the metadata may be an ICCID.

In specific implementation, optionally, the download request sent by the sending module 43 may further include the identity of the profile of the operator.

Optionally, the download request sent by the sending module 43 may further include information such as an identity of the terminal or a classification identity of the terminal.

Optionally, the addressing information of the SM-DP may be further carried in the download certificate of the download request sent by the sending module 43, for example, carried in the randomly generated sequence code, or carried in the string of encoded data generated by encrypting the metadata. In this case, the SM-SR may be notified, in advance, of a method for acquiring the addressing information of the SM-DP from the download certificate for example, the SM-SR may be notified of a location that is of the addressing information of the SM-DP and is in the download certificate or a decryption method.

In specific implementation, the sending module 43 specifically sends, to an SM-SR with which the eUICC registers, the request for downloading the profile of the operator, where the download request carries the certificate for downloading the profile of the operator, the ID of the embedded universal integrated circuit card eUICC of the terminal, and the addressing information of the SM-DP, so that after finding the SM-DP according to the addressing information of the SM-DP, the SM-SR forwards, to the SM-DP, the download request that includes the certificate for downloading the profile of the operator and the ID of the eUICC. Optionally, the forwarded request may also include information such as the identity of the profile of the operator and the identity of the terminal or the classification identity of the terminal.

In specific implementation, before the sending module 43 sends, to the SM-SR with which the eUICC registers, the request for downloading the profile of the operator, the eUICC of the terminal and the SM-SR need to perform bidirectional authentication. Similarly, before the SM-SR forwards the download request to the SM-DP, the SM-SR and the SM-DP also need to perform bidirectional authentication, and the SM-SR may verify whether a profile conflicting with the profile of the operator that is currently requested to download has already been downloaded into the eUICC (for example, a mobile on-net user of a mobile operator can access only a mobile network, and cannot access a telecommunications network; in this case, if an eUICC of a mobile terminal requests to download a profile of a telecommunications operator, even though the eUICC acquires information such as an SM-DP and a certificate for downloading the profile of the telecommunications operator, the eUICC cannot download the profile of the operator due to a profile restriction policy of the operator): if there is a conflicting file, the SM-SR may stop a procedure such as forwarding the request that is for downloading the profile of the operator and is sent by the terminal. All mentioned above are similar to those in the prior art, and details are not described herein again.

In specific implementation, the download request sent by the sending module 43 may be generated by the terminal, or may be generated by the eUICC of the terminal.

Figure 6:
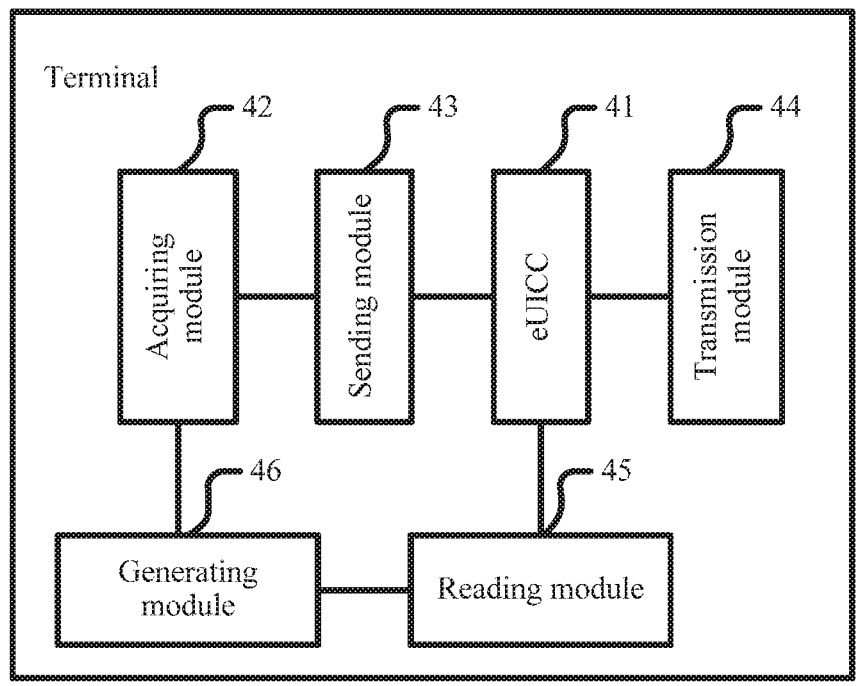
FIG. 6 is a schematic structural diagram of a terminal according to a fifth embodiment of the present invention.

When the download request sent by the sending module 43 is generated by the terminal, as shown in FIG. 6, the terminal in this embodiment of the present invention may further include a reading module 45 and a generating module 46.

The reading module 45 is connected to the eUICC 41 and is configured to: read, from the eUICC, the ID of the eUICC and addressing information of an SM-SR with which the eUICC registers; and find the SM-SR according to the addressing information, where the ID of the eUICC 41 is used to notify the SM-DP of an eUICC into which the profile of the operator needs to be downloaded, and an ID or address of the SM-SR is used to enable the sending module 43 to find the SM-SR that is used to forward the request for downloading the profile of the operator, so as to forward, to the SM-DP by using the SM-SR, the request for downloading the profile of the operator. Similarly, the addressing information of the SM-SR may include the identity or address of the SM-SR.

In specific implementation, the reading module 45 may read, by using an application protocol data unit (Application Protocol Data Unit, APDU) message, for example, read by using a READ RECORD command, the request that is for downloading the profile of the operator and is generated by the eUICC 41.

The generating module 46 is configured to generate the request for downloading the profile of the operator, where the download request carries the certificate for downloading the profile of the operator, the ID of the eUICC 41 of the terminal, and the addressing information of the SM-DP. Optionally, the download request generated by the generating module 46 may further include the information such as the identity of the profile of the operator and the identity of the terminal or the classification identity of the terminal.

In this case, in this embodiment of the present invention, the request for downloading the profile of the operator is actually generated by the terminal, the terminal serves as an initiator of the request for downloading the profile of the operator, and the download request does not pass through the eUICC 41 into which the profile of the operator really needs to be downloaded.

When the download request sent by the sending module 43 is generated by the eUICC 41 of the terminal, the transmission module 44 in this embodiment of the present invention is further configured to send, to the eUICC, the acquired download certificate used to download the profile of the operator and the acquired addressing information of the SM-DP that stores the profile of the operator. Optionally, the transmission module 44 may further send, to the eUICC, the identity of the profile of the operator and the identity of the terminal or the classification identity of the terminal.

In specific implementation, similarly, the transmission module 44 may send, to the eUICC by using an APDU message, the acquired download certificate used to download the profile of the operator and the acquired addressing information of the SM-DP that stores the profile of the operator.

For example, in this embodiment of the present invention, an INSTALL command de fined in an existing global platform card specification (Global Platform Card Specification, GPCS) may be extended, and a DATA field of the INSTALL command carries the download certificate used to download the profile of the operator, the addressing information of the SM-DP that stores the profile of the operator, the identity of the profile of the operator, the identity of the terminal or the classification identity of the terminal, and the like.

Optionally, in specific implementation, when or after sending, to the eUICC, the acquired download certificate used to download the profile of the operator and the acquired addressing information of the SM-DP that stores the profile of the operator, the transmission module 44 may further send, to the eUICC, a command of requesting or instructing the eUICC to generate and send the request for downloading the profile of the operator. For example, the terminal may add a dedicated character or code to the INSTALL command and use the dedicated character or code as a message of requesting the eUICC to generate and send the request for downloading the profile of the operator. For example, a new code is set for the INSTALL command, and the new code is carried in a P1 field of the INSTALL command to indicate that the INSTALL command is the command of requesting or instructing the eUICC to generate and send the request for downloading the profile of the operator. In addition, the transmission module 44 is further configured to receive, from the eUICC 41, the request that is for downloading the profile of the operator and is generated by the eUICC 41.

In specific implementation, similarly, the transmission module 44 may receive, from the eUICC by using an APDU message, the request that is for downloading the profile of the operator and is generated by the eUICC.

For example, in this embodiment of the present invention, an INSTALL command defined in an existing global platform card specification (Global Platform Card Specification, GPCS) may be extended, and a DATA field of the INSTALL command carries the download certificate used to download the profile of the operator, the addressing information of the SM-DP that stores the profile of the operator, the identity of the profile of the operator, the identity of the terminal or the classification identity of the terminal, and the like, where the download certificate, the addressing information, the identity of the profile of the operator, the identity of the terminal or the classification identity of the terminal, and the like are in the download request.

In this case, in this embodiment of the present invention, the request for downloading the profile of the operator is actually generated by the eUICC, the eUICC serves as an initiator of the request for downloading the profile of the operator, and the terminal provides a function of transparently transmitting the request that is for downloading the profile of the operator and is generated by the eUICC.

In specific implementation, because download certificates are different, before the transmission module 44 receives the profile of the operator that is sent by the SM-DP by using the SM-SR and that is corresponding to the download request, manners in which the SM-DP verifies that the certificate that is for downloading the profile of the operator and is carried in the download request is valid are also different.

For example, when the certificate for downloading the profile of the operator is a randomly generated sequence code, and when verifying that a sequence code that is carried in the download request and is used as the download certificate is the same as a sequence code stored in the SM-DP, the SM-DP determines that the certificate that is for downloading the profile of the operator and is carried in the download request is valid.

Alternatively, when the certificate for downloading the profile of the operator is a string of encoded data generated by encrypting metadata of the operator, and when metadata obtained after the SM-DP decodes, according to a locally stored decryption key, encoded data carried in the download request is the same as metadata that is of the profile of the operator and is stored in the SM-DP, the SM-DP determines that the certificate that is for downloading the profile of the operator and is carried in the download request is valid.

In specific implementation, when the download request further carries the identity of the profile of the operator, and the identity of the profile of the operator is a part of the download certificate or is independent of the download certificate, the SM-DP specifically obtains the profile of the operator according to the identity that is of the profile of the operator and is carried in the download request.

Certainly, in specific implementation, the SM-DP may further acquire index information according to the identity that is of the profile of the operator and is locally stored in the SM-DP, locally search the SM-DP for the identity of the profile of the operator, and acquire the profile of the operator according to the found identity of the profile of the operator.

Optionally, when the download request includes the information such as the identity of the terminal or the classification identity of the terminal, only after verifying that the certificate that is for downloading the profile of the operator and is carried in the download request is valid, and verifying that the identity of the terminal is an identity of an authorized terminal or that the classification identity of the terminal is a classification identity of an authorized terminal, the SM-DP can acquire, according to the identity of the profile of the operator, the profile of the operator that is stored in the SM-DP and is corresponding to the download request.

It can be learned from above that, in some feasible implementation manners of the present invention, a request for downloading a profile of an operator is initiated by a terminal in this embodiment of the present invention, which avoids a case in which the operator needs to know, in advance, identity information of an eUICC of the terminal that needs to download the profile of the operator. In addition, in this embodiment of the present invention, an SM-DP verifies whether a download certificate in the download request is valid to determine whether the initiated download request is valid, without verifying whether an object that initiates the download request is valid any longer; moreover, the download certificate may be obtained by the terminal before the terminal initiates the download request. Therefore, the terminal can acquire the certificate for downloading the profile of the operator, provided that the terminal needs to download the profile of the operator into the eUICC of the terminal. That is, in this embodiment of the present invention, a range of objects that can download the profile of the operator may be extended to all eUICCs. In addition, in this embodiment of the present invention, because the request for downloading the profile of the operator is initiated by the terminal, an end user certainly can freely select an opportunity for downloading the profile of the operator.

Figure 7:
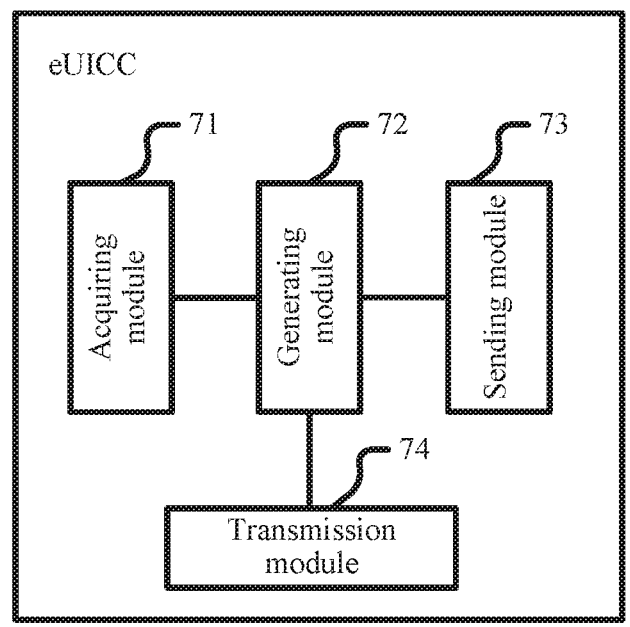
FIG. 7 is a schematic structural diagram of an embedded universal integrated circuit card eUICC according to a sixth embodiment of the present invention.

FIG. 7 is a schematic structural diagram of an embedded universal integrated circuit card eUICC according to a sixth embodiment of the present invention. As shown in FIG. 7, the eUICC may include: an acquiring module 71, a generating module 72, a sending module 73, and a transmission module 74, where:

the acquiring module 71 is configured to acquire a download certificate used to download a profile of an operator and addressing information of a SM-DP that stores the profile of the operator;

the generating module 72 is configured to generate a request for downloading the profile of the operator, where the download request carries the certificate for downloading the profile of the operator, an ID of the eUICC, and the addressing information of the SM-DP;

the sending module 73 is configured to send the generated download request to the SM-DP by using a SM-SR; and the transmission module 74 is configured to receive the profile of the operator that is sent by the SM-DP by using the SM-SR and is corresponding to the download request, where the profile of the operator is obtained by the SM-DP according to an identity of the profile of the operator after the SM-DP verifies that the certificate that is for downloading the profile of the operator and is carried in the download request is valid.

In specific implementation, in some other embodiments, the eUICC may not include the acquiring module 71 and the generating module 72. In this case, the sending module 73 may obtain, in another way, information such as the certificate for downloading the profile of the operator and the addressing information of the SM-DP that stores the profile of the operator, where the information is in the download request.

In specific implementation, the operator (for example, an MNO) may entrust the SM-DP to generate the profile of the operator (which is generally referred to as a profile of the operator for short). The profile may include subscription data that is of the operator and is needed for accessing a network of the operator, such as an international mobile subscriber identity (International Mobile Subscriber Identification Number, IMSI, a Ki (16-byte key data generated by a card manufacturer), a parameter required in an encryption algorithm. The profile may further include installation or revision packages of various applications, for example, may include an installation package of Fetion and an update package of QQ. Optionally, similar to the prior art, the operator may further limit, by using the SM-DP, a terminal that can download the profile of the operator. For example, the operator may store, in the SM-DP, an identity of the terminal that can download the profile of the operator or a classification identity of the terminal.

In specific implementation, the addressing information of the SM-DP may include information such as an identity or address of the SM-DP, where the identity uniquely identifies the SM-DP.

Figure 8:
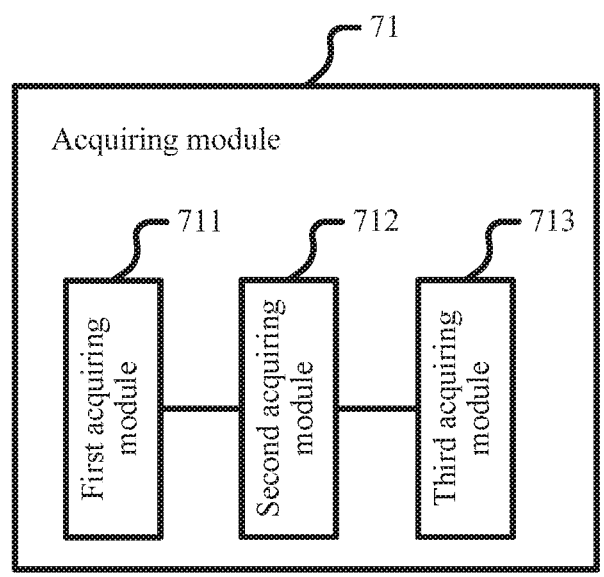
FIG. 8 is a schematic structural diagram of an acquiring module 71 according to the sixth embodiment of the present invention.

In specific implementation, the acquiring module 71 may acquire, in multiple ways, information such as the download certificate used to download the profile of the operator, the addressing information of the SM-DP that stores the profile of the operator, and the identity of the profile of the operator. As shown in FIG. 8, the acquiring module 71 in this embodiment of the present invention includes but is not limited to at least one of the following sub-modules: a first acquiring module 711, a second acquiring module 712, or a third acquiring module 713.

The first acquiring module 711 is configured to receive, from a terminal, the information such as the download certificate used to download the profile of the operator, the addressing information of the SM-DP that stores the profile of the operator, and the identity of the profile of the operator.

In specific implementation, the first acquiring module 711 may receive, from the terminal by using an existing APDU message or an added APDU message, the information such as the download certificate used to download the profile of the operator, the addressing information of the SM-DP that stores the profile of the operator, and the identity of the profile of the operator. For example, in this embodiment of the present invention, an INSTALL command defined in an existing global platform card specification (Global Platform Card Specification, GPCS) may be extended, and a DATA field of the INSTALL command carries the information such as the download certificate used to download the profile of the operator, the addressing information of the SM-DP that stores the profile of the operator, and the identity of the profile of the operator.

Alternatively, the second acquiring module 712 is configured to receive the information such as the download certificate used to download the profile of the operator, the addressing information of the SM-DP that stores the profile of the operator, and the identity of the profile of the operator, where the information is entered by a user by using an interface of software (for example, SIM application toolkit (SIM application toolkit, SAT) software) that is in the eUICC and is for downloading a profile of an operator. In the manner, the user may acquire, in multiple ways, the information such as the download certificate used to download the profile of the operator, the addressing information of the SM-DP that stores the profile of the operator, and the identity of the profile of the operator. For example, the user may purchase a dedicated information card, and acquire, by dialing a particular phone number on the information card or entering a particular verification code on the information card, the information such as the download certificate used to download the profile of the operator, the addressing information of the SM-DP that stores the profile of the operator, and the identity of the profile of the operator; or the user may directly read, from a purchased information card, the information such as the download certificate used to download the profile of the operator, the addressing information of the SM-DP that stores the profile of the operator, and the identity of the profile of the operator. For another example, the user may further directly go to a retail store or a business hall of the operator, and acquire, from a customer service representative of the operator, the information such as the download certificate used to download the profile of the operator, the addressing information of the SM-DP that stores the profile of the operator, and the identity of the profile of the operator. For another example, the end user may further log in to a network platform of the operator by using built-in application software of a device except the terminal, and acquire, from the network platform, the information such as the download certificate used to download the profile of the operator, the addressing information of the SM-DP that stores the profile of the operator, and the identity of the profile of the operator.

Alternatively, the third acquiring module 713 is configured to: log in to a network platform of the operator by using built-in application software of the eUICC; and acquire, from the network platform, the information such as the download certificate used to download the profile of the operator, the addressing information of the SM-DP that stores the profile of the operator, and the identity of the profile of the operator.

In specific implementation, in this embodiment of the present invention, the certificate for downloading the profile of the operator is uniquely corresponding to the profile of the operator, and is used as a unique certificate for downloading the profile of the operator. In specific implementation, the download certificate may be in various forms, which include but are not limited to:

The certificate for downloading the profile of the operator is a randomly generated sequence code.

Alternatively, the certificate for downloading the profile of the operator is a string of encoded data generated by encrypting metadata of the profile of the operator. A manner of the encryption may be one of various existing encryption manners, and a form of the encoded data may be an ordinary binary code, or may be a two-dimensional code or the like. The metadata may be extracted from the profile of the operator. For example, the metadata may be an ICCID. Optionally, the download request generated by the generating module 72 may further include information such as the identity of profile of the operator, a terminal identity of the terminal, or a classification identity of the terminal.

Optionally, the addressing information of the SM-DP may be further carried in the download certificate of the download request generated by the generating module 72, for example, carried in the randomly generated sequence code, or carried in the string of encoded data generated by encrypting the metadata.

In this case, the SM-SR may be notified, in advance, of a method for acquiring the addressing information of the SM-DP from the download certificate; for example, the SM-SR may be notified of a location that is of the addressing information of the SM-DP and is in the download certificate or a decryption method.

In specific implementation, the transmission module 74 may further receive, from the terminal, a command of requesting or instructing the eUICC to generate the request for downloading the profile of the operator The eUICC may further receive a command of requesting or instructing the eUICC to generate the request for downloading the profile of the operator, where the command is entered by the user or sent by another device. In specific implementation, similarly, the message may be sent by using an APDU message; for example, an INSTALL command defined in a GPCS may be extended, a dedicated character or code is added to the INSTALL command and the dedicated character or code is used as the command of requesting the eUICC to generate and send the request for downloading the pro file of the operator. For example, a new code is set for the INSTALL command, and the new code is carried in a P1 field of the INSTALL command to indicate that the INSTALL command is the command of requesting or instructing the eUICC to generate and send the request for downloading the profile of the operator.

In specific implementation, the sending module 73 sends, to an SM-SR with which the eUICC registers, the request for downloading the profile of the operator, where the download request carries the certificate for downloading the profile of the operator, the ID of the embedded universal integrated circuit card eUICC of the terminal, and the addressing information of the SM-DP, so that after finding the SM-DP according to the addressing information of the SM-DP, the SM-SR forwards, to the SM-DP, the download request that includes the certificate for downloading the profile of the operator and the ID of the eUICC. Optionally, the forwarded request may also include the information such as the identity of the profile of the operator and the identity of the terminal or the classification identity of the terminal. In specific implementation, information between the eUICC and the SM-SR may be transparently transmitted by using the terminal.

In specific implementation, before the sending module 73 sends, to the SM-SR with which the eUICC registers, the request for downloading the profile of the operator, the eUICC and the SM-SR need to perform bidirectional authentication. Similarly, before the SM-SR forwards the download request to the SM-DP, the SM-SR and the SM-DP also need to perform bidirectional authentication, and the SM-SR may verify whether a profile conflicting with the profile of the operator that is currently requested to download has already been downloaded into the eUICC (for example, a mobile on-net user of a mobile operator can access only a mobile network, and cannot access a telecommunications network; in this case, if an eUICC of a mobile terminal requests to download a profile of a telecommunications operator, even though the eUICC acquires information such as an SM-DP and a certificate for downloading the profile of the telecommunications operator, the eUICC cannot download the profile of the operator due to a profile restriction policy of the operator); if there is a conflicting file, the SM-SR may stop a procedure such as forwarding the request that is for downloading the profile of the operator and is sent by the eUICC. All mentioned above are similar to those in the prior art, and details are not described herein again.

In specific implementation, because download certificates are different, before the transmission module 74 receives, from the terminal, the profile of the operator that is sent by the SM-DP by using the subscription manager-data preparing SM-SR and that is corresponding to the download request, manners in which the SM-DP verifies that the certificate that is for downloading the profile of the operator and is carried in the download request is valid are also different.

For example, when the certificate for downloading the profile of the operator is a randomly generated sequence code, and when verifying that a sequence code that is carried in the download request and is used as the download certificate is the same as a sequence code stored in the SM-DP, the SM-DP determines that the certificate that is for downloading the profile of the operator and is carried in the download request is valid.

Alternatively, when the certificate for downloading the profile of the operator is a string of encoded data generated by encrypting metadata of the operator, and when metadata obtained after the SM-DP decodes, according to a locally stored decryption key, encoded data carded in the download request is the same as metadata that is of the profile of the operator and is stored in the SM-DP, the SM-DP determines that the certificate that is for downloading the profile of the operator and is carried in the download request is valid.

In specific implementation, when the download request further carries the identity of the profile of the operator, and the identity of the profile of the operator is a part of the download certificate or is independent of the download certificate, the SM-DP specifically obtains the profile of the operator according to the identity that is of the profile of the operator and is carried in the download request.

Certainly, in specific implementation, the SM-DP may further acquire index information according to the identity that is of the profile of the operator and is locally stored in the SM-DP, locally search the SM-DP for the identity of the profile of the operator, and acquire the profile of the operator according to the found identity of the profile of the operator.

Optionally, when the download request includes information such as the identity of the terminal or the classification identity of the terminal, only after verifying that the certificate that is for downloading the profile of the operator and is carried in the download request is valid, and verifying that the identity of the terminal is an identity of an authorized terminal or that the classification identity of the terminal is a classification identity of an authorized terminal, the SM-DP can acquire, according to the identity of the profile of the operator, the profile of the operator that is stored in the SM-DP and is corresponding to the download request. In this embodiment, a manner embodiment of downloading a profile of an operator in the embodiments of the present invention is described from an eUICC side by using examples. When a request for downloading a profile of an operator is initiated by an eUICC, a terminal provides a function of transparently transmitting the request that is for downloading the profile of the operator and is generated by the eUICC.

It can be learned from above that, in some feasible implementation manners of the present invention, a request for downloading a profile of an operator is initiated by an eUICC of a terminal in this embodiment of the present invention, which avoids a case in which the operator needs to know, in advance, identity information of the eUICC of the terminal that needs to download the profile of the operator. In addition, in this embodiment of the present invention, an SM-DP verifies whether a download certificate in the download request is valid to determine whether the initiated download request is valid, without verifying whether an object that initiates the download request is valid any longer; moreover, the download certificate may be obtained by the terminal before the terminal initiates the download request. Therefore, the terminal can acquire the certificate for downloading the profile of the operator, provided that the terminal needs to download the profile of the operator into the eUICC of the terminal. That is, in this embodiment of the present invention, a range of objects that can download the profile of the operator may be extended to all eUICCs. In addition, in this embodiment of the present invention, because the request for downloading the profile of the operator is initiated by the terminal, an end user certainly can freely select an opportunity for downloading the profile of the operator.

Figure 9:
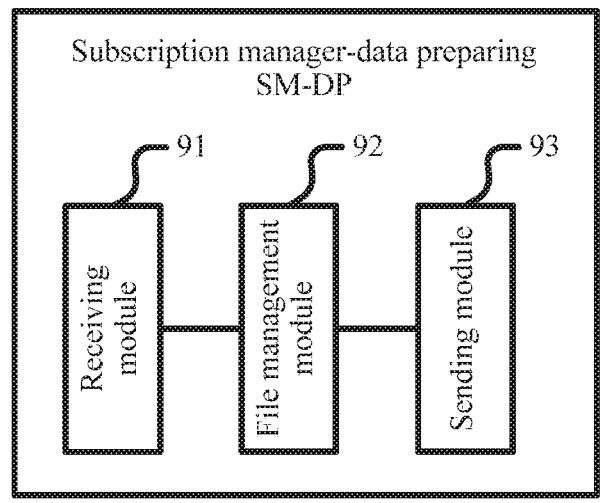
FIG. 9 is a schematic structural diagram of a SM-DP according to a seventh embodiment of the present invention.

FIG. 9 is a schematic structural diagram of a SM-DP according to a seventh embodiment of the present invention. As shown in FIG. 9, the SM-DP may include at least a receiving module 91, a profile management module 92, and a sending module 93, where:

the receiving module 91 is configured to receive, from a terminal or an embedded universal integrated circuit card eUICC of the terminal, a request that is for downloading a profile of an operator and is forwarded by a SM-SR, where the download request carries an ID of the eUICC and a certificate for downloading the profile of the operator;

the profile management module 92 is connected to the receiving module 91 and is configured to: after verifying that the certificate that is for downloading the profile of the operator and is carried in the download request is valid, acquire, according to an identity of the profile of the operator, the profile of the operator that is stored in the SM-DP and is corresponding to the download request; and the sending module 93 is configured to send, by using the SM-SR, the profile that is of the operator and is corresponding to the download request to the eUICC.

In specific implementation, in this embodiment of the present invention, the terminal or the eUICC of the terminal may serve as an initiator of the download request, that is, the request for downloading the profile of the operator may be from the terminal or the eUICC.

When the terminal serves as the initiator of the download request, the terminal reads, from the eUICC, the ID of the eUICC and addressing information of the SM-SR, where the addressing information is used to find the SM-SR, the addressing information may include an identity or address of the SM-SR, and the identity may uniquely identify the SM-SR. Then, the terminal generates the request for downloading the profile of the operator, and sends the download request. In this case, in this embodiment of the present invention, when the download request is sent, the download request may not pass through the eUICC into which the profile of the operator really needs to be downloaded.

When the eUICC of the terminal serves as the initiator of the download request, the eUICC sends the generated download request to the terminal, and sends the generated download request to the SM-SR by using the terminal. In this case, the terminal provides a function of transparently transmitting the request that is for downloading the profile of the operator and is generated by the eUICC.

In specific implementation, the operator (for example, an MNO) may entrust the SM-DP to generate the profile of the operator (which is generally referred to as a profile of the operator for short). The profile may include subscription data that is of the operator and is needed for accessing a network of the operator, such as an international mobile subscriber identity (International Mobile Subscriber Identification Number, IMSI), a Ki (16-byte key data generated by a card manufacturer), a parameter required in an encryption algorithm. The profile may further include installation or revision packages of various applications, for example, may include an installation package of Fetion and an update package of QQ. Optionally, similar to the prior art, the operator may further limit, by using the SM-DP, a terminal that can download the profile of the operator. For example, the operator may store, in the SM-DP, an identity of the terminal that can download the profile of the operator or a classification identity of the terminal.

In specific implementation, the addressing information of the SM-DP may include information such as an identity or address of the SM-DP, where the identity uniquely identifies the SM-DP.

In specific implementation, the operator (for example, an MNO) may further generate or entrust the SM-DP to generate information such as the certificate for downloading the profile of the operator and the identity of the profile of the operator. In specific implementation, the identity of the profile of the operator may be an ICCID or any other identity that can uniquely identify the profile of the operator. When the operator generates the information such as the certificate for downloading the profile of the operator and the identity of the profile of the operator, the receiving module 91 may be further configured to store the information such as the certificate for downloading the profile of the operator and the identity of the pro file of the operator, where the information is generated by the operator.

When the operator entrusts the SM-DP to generate the profile of the operator and to generate the information such as the certificate for downloading the profile of the operator and the identity of the profile of the operator, the SM-DP may further include: a generating module (not shown in the figure), configured to generate and store, according to a request of the operator, the profile of the operator and the information such as the certificate for downloading the profile of the operator and the identity of the profile of the operator.

Optionally, in this embodiment of the present invention, the download request received by the receiving module 91 may further include the identity of the profile of the operator.

Optionally, in this embodiment of the present invention, the download request received by the receiving module 91 may include an identity of the terminal or a classification identity of the terminal.

In specific implementation, because download certificates are different, manners in which the profile management module 92 verifies that the certificate that is for downloading the profile of the operator and is carried in the download request is valid are also different.

For example, when the certificate for downloading the profile of the operator is a randomly generated sequence code, and when verifying that a sequence code that is carried in the download request and is used as the download certificate is the same as a sequence code stored in the SM-DP, the profile management module 92 determines that the certificate that is for downloading the profile of the operator and is carried in the download request is valid.

Alternatively, when the certificate for downloading the profile of the operator is a string of encoded data generated by encrypting metadata of the operator, and when metadata obtained after the profile management module 92 decodes, according to a locally stored decryption key, encoded data carried in the download request is the same as metadata that is of the profile of the operator and is stored in the SM-DP, the profile management module 92 determines that the certificate that is for downloading the profile of the operator and is carried in the download request is valid.

In specific implementation, when the download request further carries the identity of the profile of the operator, and the identity of the profile of the operator is a part of the download certificate or is independent of the download certificate, the profile management module 92 specifically obtains the profile of the operator according to the identity that is of the profile of the operator and is carried in the download request. In specific implementation, when the download request further includes the identity of the terminal or the classification identity of the terminal.

only after verifying that the certificate that is for downloading the profile of the operator and is carried in the download request is valid, and verifying that the identity of the terminal is an identity of an authorized terminal or that the classification identity of the terminal is a classification identity of an authorized terminal, the profile management module 92 can acquire, according to the identity of the profile of the operator, the profile of the operator that is stored in the SM-DP and is corresponding to the download request.

It can be learned from above that, in some feasible implementation manners of the present invention, a SM-DP receives, from a terminal or an embedded universal integrated circuit card eUICC of the terminal, a request that is for downloading a profile of an operator and is forwarded by a SM-SR, where the download request carries an ID of the eUICC and a certificate for downloading the profile of the operator; after verifying that the certificate that is for downloading the profile of the operator and is carried in the download request is valid, the SM-DP acquires, according to an identity of the profile of the operator, the profile of the operator that is stored in the SM-DP and is corresponding to the download request; and the SM-DP sends, by using the SM-SR, the profile that is of the operator and is corresponding to the download request to the eUICC. In this embodiment of the present invention, a request for downloading a profile of an operator is initiated by a terminal side (a terminal or an eUICC of a terminal), thereby avoiding a case in which the operator needs to know, in advance, identity information of the eUICC of the terminal that needs to download the profile of the operator.

In addition, in this embodiment of the present invention, an SM-DP verifies whether a download certificate in the download request is valid to determine whether the initiated download request is valid, without verifying whether an object that initiates the download request is valid any longer; moreover, the download certificate may be obtained by the terminal before the terminal initiates the download request. Therefore, the terminal can acquire the certificate for downloading the profile of the operator, provided that the terminal needs to download the profile of the operator into the eUICC of the terminal. That is, in this embodiment of the present invention, a range of objects that can download the profile of the operator may be extended to all eUICCs. In addition, in this embodiment of the present invention, because the request for downloading the profile of the operator is initiated by the terminal, an end user certainly can freely select an opportunity for downloading the profile of the operator.

Structures of the terminal, the eUICC, and the SM-DP that are in the embodiments of the present invention are described in FIG. 4 to FIG. 9 from a perspective of a functional module by using examples, and structures of the terminal, the eUICC, and the SM-DP that are in the embodiments of the present invention are further described in the following from a perspective of a hardware module by using examples.

Figure 10:
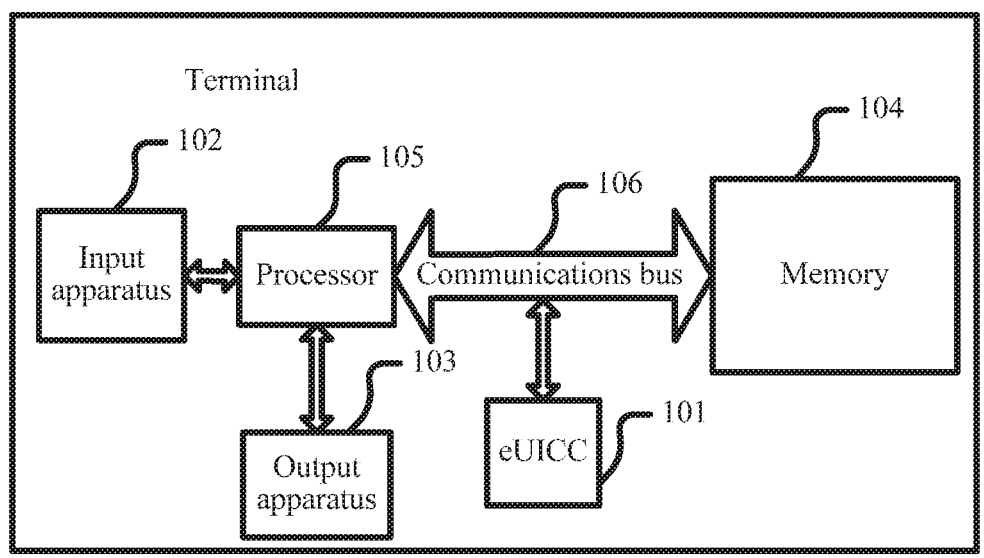
FIG. 10 is a schematic structural diagram of a terminal according to an eighth embodiment of the present invention.

FIG. 10 is a schematic structural diagram of a terminal according to an eighth embodiment of the present invention. As shown in FIG. 10, the terminal may include at least an eUICC 101, an input apparatus 102, an output apparatus 103, a memory 104, and a processor 105, which are connected by using a bus 106. In specific implementation, the input apparatus 102 in this embodiment of the present invention may be a touchscreen, a keyboard, a microphone, a camera, a radio frequency antenna, or the like; the output apparatus 103 in the present invention may be a display (or may be a touchscreen), a loudspeaker, a radio frequency antenna, or the like in this embodiment of the present invention, the memory 104 is configured to store various kinds of information of the terminal, and store program code; the processor 105 is configured to invoke the code stored in the memory 104, and perform a corresponding operation.

In specific implementation, the processor 105 or the input apparatus 102 is configured to acquire a download certificate used to download a profile of an operator and addressing information of a SM-DP that stores the profile of the operator. For example, the processor 105 may invoke application software stored in the memory 104 to log in to a network platform of the operator, and acquire, from the network platform, the download certificate used to download the profile of the operator and the addressing information of the SM-DP that stores the profile of the operator; the input apparatus 102 (for example, a touchscreen, a key, or the like) may receive the download certificate used to download the profile of the operator and the addressing information of the SM-DP that stores the profile of the operator, where the download certificate and the addressing information are manually entered by a user; the input apparatus 102 (a camera) may acquire, by scanning a two-dimensional code, the download certificate used to download the profile of the operator and the addressing information of the SM-DP that stores the profile of the operator. Optionally, the processor 105 and the input apparatus may further acquire, in a same manner of acquiring the download certificate and the addressing information of the SM-DP, information such as an identity of the profile of the operator.

The output apparatus 103 (for example, a radio frequency) is configured to send, to the SM-DP by using a SM-SR, a request for downloading the profile of the operator, where the download request carries the certificate for downloading the profile of the operator, an ID of the eUICC 101, and the addressing information of the SM-DP. In specific implementation, the download request sent by the output apparatus 103 may also include information such as an ICCID of the profile of the operator, or an identity of the terminal, or a classification identity of the terminal.

In specific implementation, the input apparatus 102 is configured to: receive the profile of the operator that is sent by the SM-DP by using the SM-SR and is corresponding to the download request, and transmit the profile of the operator to the eUICC 101 by using the bus 106, where the profile of the operator is obtained by the SM-DP according to the identity of the profile of the operator after the SM-DP verifies that the certificate that is for downloading the profile of the operator and is carried in the download request is valid.

In specific implementation, the output apparatus 103 is further configured to send, to the eUICC, the download certificate used to download the profile of the operator and the addressing information of the SM-DP that stores the profile of the operator, where the download certificate and the addressing information are acquired by the processor 105 or the input apparatus 102. Optionally, the output apparatus 103 may further send, to the eUICC, the identity of the profile of the operator, or the identity of the terminal, or the classification identity of the terminal.

In specific implementation, the input apparatus 102 is further configured to read, from the eUICC, the ID of the eUICC and the addressing information of the SM-SR, and send the ID of the eUICC and the addressing information of the SM-SR to the processor 105.

The processor 105 is further configured to generate the request for downloading the profile of the operator, where the download request carries the certificate for downloading the profile of the operator, the ID of the eUICC of the terminal, and the addressing information of the SM-DP. Optionally, the download request may further include information such as the identity of the profile of the operator, the identity of the terminal, or the classification identity of the terminal.

Alternatively, the input apparatus 102 is further configured to receive, from the eUICC, the request that is for downloading the profile of the operator and is generated by the eUICC, where the download request carries the certificate for downloading the profile of the operator, the ID of the eUICC of the terminal, and the addressing information of the SM-DP. Optionally, the received download request may further include information such as the identity of the profile of the operator, the identity of the terminal, or the classification identity of the terminal.

The output apparatus 103 is further configured to send, to the eUICC, a command of requesting or instructing the eUICC to generate and send the request for downloading the profile of the operator.

Figure 11:
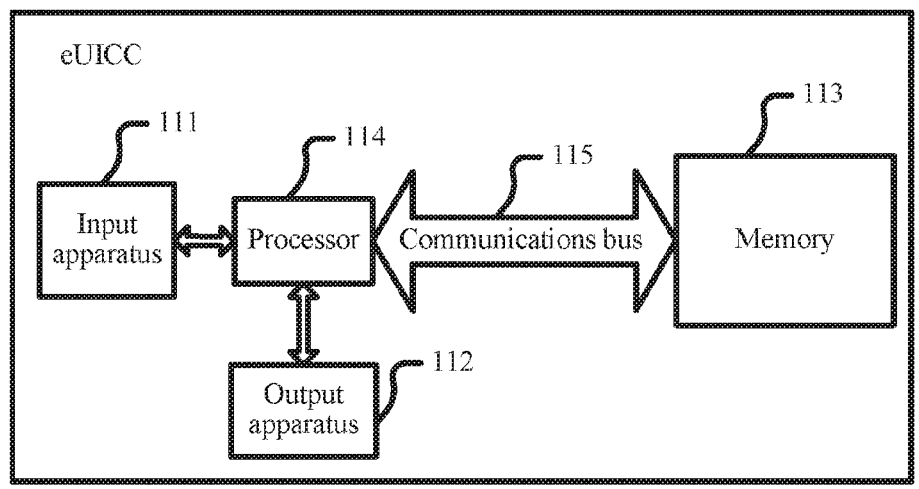
FIG. 11 is a schematic structural diagram of an eUICC according to a ninth embodiment of the present invention.

FIG. 11 is a schematic structural diagram of an eUICC according to a ninth embodiment of the present invention. As shown in FIG. 11, the eUICC may include: an input apparatus 111, an output apparatus 112, a memory 113, and a processor 114, which are connected by using a bus 115, and the eUICC is connected to a terminal by using the bus 115. In specific implementation, the input apparatus 111 and the output apparatus 112 may be various interfaces used for communication between the eUICC and the terminal the processor 114 is a microprocessor inside the eUICC. The memory 113 stores a profile that is of an operator and is needed by the terminal to access the operator, an ID or address of the eUICC, an ID or address of an SM-SR to which the eUICC may be connected, and the like.

In specific implementation, the processor 114 or the input apparatus 111 may be configured to acquire a download certificate used to download the profile of the operator and addressing information of a SM-DP that stores the profile of the operator. For example, the input apparatus 111 may receive the download certificate used to download the profile of the operator and the addressing information of the SM-DP that stores the profile of the operator; or the input apparatus 111 may receive the download certificate used to download the profile of the operator and the addressing information of the SM-DP that stores the profile of the operator, where the download certificate and the addressing information are entered by a user by using an interface of software that is in the eUICC and is for downloading a profile of an operator; or the processor 114 may log in to a network platform of the operator by invoking built-in application software of the eUICC, and acquire, from the network platform, the download certificate used to download the profile of the operator and the addressing information of the SM-DP that stores the profile of the operator.

Further, the processor 114 may generate a request for downloading the profile of the operator, where the download request carries the certificate for downloading the profile of the operator, the ID of the eUICC, and the addressing information of the SM-DP.

Further, the output apparatus 112 may send the generated download request to the SM-DP by using the SM-SR.

Further, the input apparatus 111 may receive the profile of the operator that is sent by the SM-DP by using the SM-SR and that is corresponding to the download request, where the profile of the operator is obtained by the SM-DP according to an identity of the profile of the operator after the SM-DP verifies that the certificate that is for downloading the profile of the operator and is carried in the download request is valid.

Further, the output apparatus 112 specifically sends the generated download request to an SM-SR with which the eUICC registers, where the download request carries the certificate for downloading the profile of the operator, the ID of the embedded universal integrated circuit card eUICC of the terminal, and the addressing information of the SM-DP, so that after finding the SM-DP according to the addressing information of the SM-DP, the SM-SR forwards, to the SM-DP the download request that includes the certificate for downloading the profile of the operator and the ID of the eUICC.

Further, before the processor 114 generates the request for downloading the profile of the operator, the input apparatus 111 receives, from the terminal, a command of requesting or instructing the eUICC to generate the request for downloading the profile of the operator.

Figure 12:
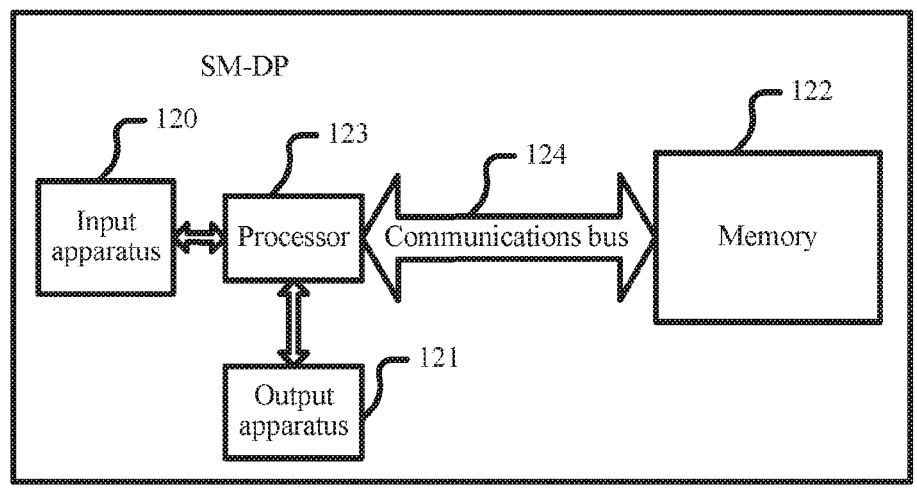
FIG. 12 is a schematic structural diagram of an SM-DP according to a tenth embodiment of the present invention.

FIG. 12 is a schematic structural diagram of an SM-DP according to a tenth embodiment of the present invention. As shown in FIG. 12, the SM-DP may include: an input apparatus 120, an output apparatus 121, a memory 122, and a processor 123, which are connected by using a bus 124. In specific implementation, the input apparatus 120 in this embodiment of the present invention may be a touchscreen, a keyboard, a microphone, a camera, a radio frequency antenna, or the like; the output apparatus 121 in the present invention may be a display (or may be a touchscreen), a loudspeaker, a radio frequency antenna, or the like. In this embodiment of the present invention, the memory 122 is configured to store program code; the processor 123 is configured to invoke the code stored in the memory 122, and perform a corresponding operation. The memory 122 is further configured to store a profile of an operator and information such as a certificate for downloading the profile of the operator, and an ICCID of the profile of the operator.

In specific implementation, the input apparatus 120 is configured to receive, from a terminal or an embedded universal integrated circuit card eUICC of the terminal, a request that is for downloading the profile of the operator and is forwarded by a SM-SR, where the download request carries an ID of the eUICC and the certificate for downloading the profile of the operator.

In specific implementation, the processor 123 is configured to: after verifying that the certificate that is for downloading the profile of the operator and is carried in the download request is valid, acquire, according to an identity of the profile of the operator, the profile of the operator that is stored in the memory 122 and is corresponding to the download request.

In specific implementation, the output apparatus 121 configured to send, to the eUICC by using the SM-SR, the profile of the operator that is acquired by the processor 123 and is corresponding to the download request.

In specific implementation, the input apparatus 120 is further configured to receive and store the certificate for downloading the profile of the operator and the identity of the profile of the operator, where the download certificate and the identity of the profile of the operator are generated by the operator; or the processor 123 is further configured to generate and store, according to a request of the operator, the certificate for downloading the profile of the operator and the identity of the profile of the operator.

In specific implementation, when the certificate for downloading the profile of the operator is a randomly generated sequence code, and when verifying that a sequence code that is carried in the download request and is used as the download certificate is the same as a sequence code stored in the SM-DP, the processor 123 determines that the certificate that is for downloading the profile of the operator and is carried in the download request is valid.

When the certificate for downloading the profile of the operator is a string of encoded data generated by encrypting metadata of the operator, and when metadata obtained after processor 123 decodes, according to a decryption key stored in the memory 122, encoded data carried in the download request is the same as metadata that is of the profile of the operator and is stored in the SM-DP, the processor 123 determines that the certificate that is for downloading the profile of the operator and is carried in the download request is valid. In specific implementation, the metadata may be extracted from the profile of the operator, and the metadata may include an ICCID of the profile of the operator.

In specific implementation, the download request received by the input apparatus 120 further includes an identity of the terminal or a classification identity of the terminal.

In this case, the processor 123 is specifically configured to: after verifying that the certificate that is for downloading the profile of the operator and is carried in the download request is valid, and verifying that the identity of the terminal is an identity of an authorized terminal or that the classification identity of the terminal is a classification identity of an authorized terminal, acquire, according to the identity of the profile of the operator, the profile of the operator that is stored in the memory 122 and is corresponding to the download request.

Modules in this embodiment of the present invention may be implemented by using a universal integrated circuit (such as a central processing unit CPU) or an application-specific integrated circuit (ASIC). A person of ordinary skill in the art may understand that all or some steps of the various methods in the foregoing embodiments may be implemented by a program instructing relevant modules. The program may be stored in a computer readable storage medium. The storage medium may include: a flash memory, a read-only memory (Read-Only Memory, ROM), a random access memory (Random Access Memory, RAM), a magnetic disk, an optical disk, or the like.

Figure 13A:
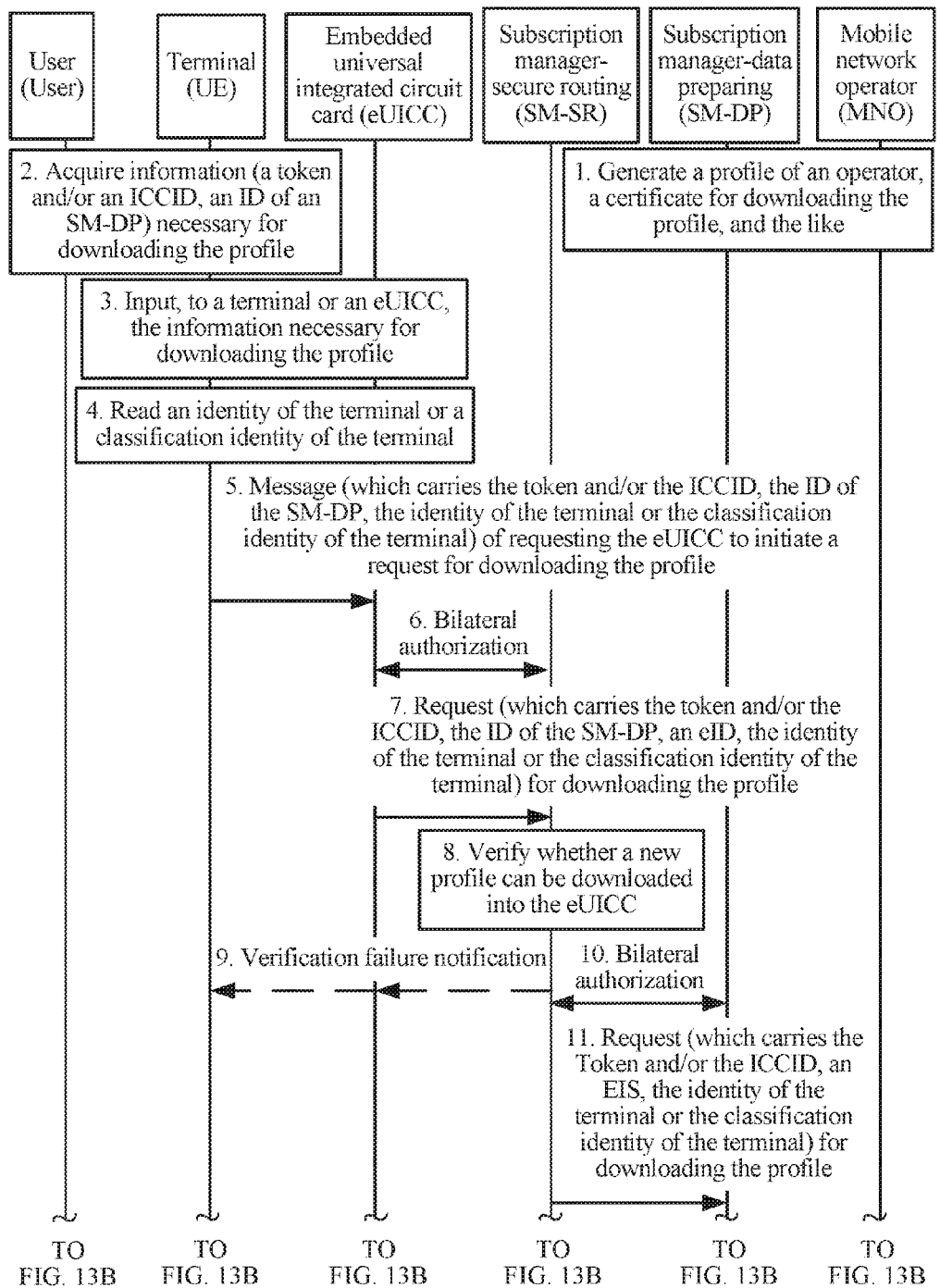
FIG. 13A and FIG. 13B are detailed schematic flowcharts of a method for downloading and installing a profile of an operator according to an eleventh embodiment of the present invention.
Figure 13B:
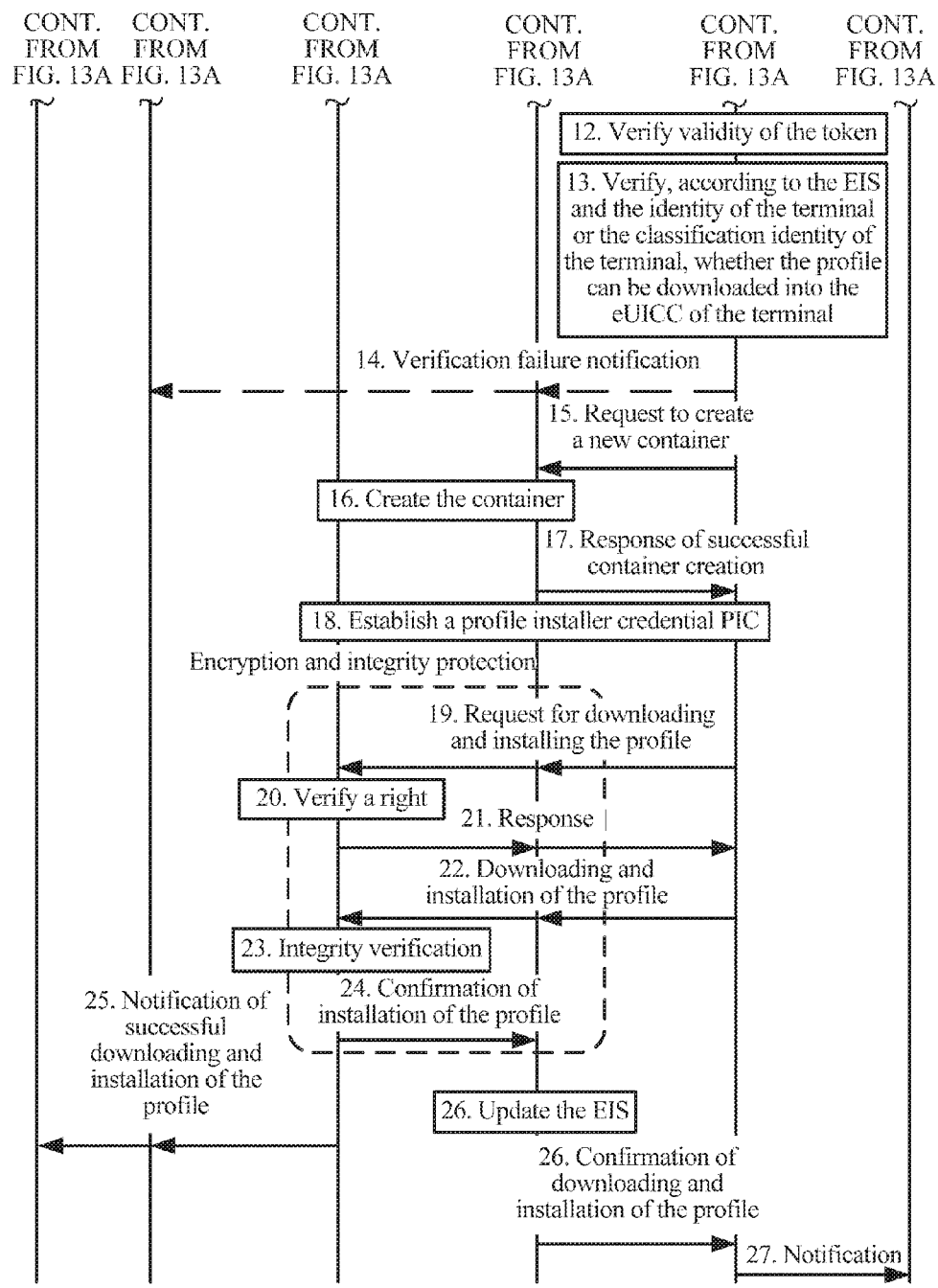

FIG. 13A and FIG. 13B are detailed schematic flowcharts of a method for downloading and installing a profile of an operator according to an eleventh embodiment of the present invention. The procedure includes related procedures in most foregoing embodiments of the present invention. In the following part, a profile is substituted for the subscription agreement of the operator in each of the foregoing embodiments, and a token is substituted for the download certificate in each of the foregoing embodiments. As shown in FIG. 12, the procedure includes:

Step 1. According to information provided by an MNO, an SM-DP generates, for the MNO, a profile that can be downloaded into an eUICC of a terminal, generates a token that is used to download the profile, and stores the token in the SM-DP. Optionally, the MNO may further limit a terminal or a terminal that is in a list and into which the profile can be downloaded (for example, a batch of profiles generated for a batch of smart meters of a meter manufacturer can be downloaded into only this batch of meters of the meter manufacturer), or a type of a terminal (for example, whether the profile can be downloaded into only a smartphone or a terminal of the Internet of Things), where a manner of limiting the terminal or the type of the terminal may be embodied by using an identity of the terminal or a classification identity of the terminal.

Step 2. An end user selects the operator on line, or selects the operator in a retail store/business hall, or purchases a card (similar to a recharge card) specially used to download the profile, so as to acquire information necessary for downloading the profile, such as the token, or an ID of the SM-DP that stores the profile; optionally, the information may further include an ICCID of the profile.

Step 3. The user stores the token, the ID of the SM-DP, the ICCID, and the like to the terminal or the eUICC by using a related application on the terminal, or an application that is in the eUICC and is specially used to download the profile, or by scanning a two-dimensional code (if the information is in a form of a two-dimensional code).

Step 4. The related application of the terminal reads an identity (such as an IMEI) or a classification identity (for example, whether the terminal is an M2M device, a smartphone, or the like) of the terminal, where this step is optional and is unnecessarily executed.

Step 5. The terminal requests, by using an APDU message, the eUICC to initiate a request for downloading the profile. Specifically, an INSTALL command defined in an existing GPCS may be extended; a new code is added to a P1 field of the INSTALL command to indicate that the APDU message is a message of requesting the eUICC to initiate the request for downloading the profile; a DATA field of the INSTALL command may carry the token, the ICCID, and the ID of the SM-DP, and may further carry an identity or a classification identity of the terminal.

(In the foregoing step 1 to step 5, the eUICC is mainly enabled to acquire information, such as the token, the ICCID, the ID of the SM-DP, and the identity of the terminal or the classification identity of the terminal, that is needed for downloading the profile.)

Step 6. The eUICC and an SM-SR perform bidirectional authorization. The eUICC stores information such as an ID or address of the SM-SR.

Step 7. After the bidirectional authorization, the eUICC sends, to the SM-SR, the request for downloading the profile; and before sending the request for downloading the profile, the eUICC generates the download request according to the token, the ICCID, the ID of the SM-DP, the identity of the terminal or the classification identity of the terminal, and the like that are acquired. The download request carries at least the token, an ID of the eUICC (marked as an eID for short and the ID of the SM-DP, and optionally, may further carry the ICCID and the identity of the terminal or the classification identity of the terminal.

Step 8. The SM-SR verifies whether a new profile is allowed to be downloaded into the eUICC (for example, the SM-SR detects whether a corresponding policy allows a new profile to be downloaded into the eUICC, and the like; for example, it is assumed that the terminal is a mobile carrier-branded smartphone, and the profile is a profile for accessing a telecommunications network, the profile for accessing a telecommunications network cannot be downloaded into an eUICC of a mobile terminal, and in this case, a verification result of step 8 is that a new profile is not allowed to be downloaded into the eUICC), and if a new profile is allowed to be downloaded into the eUICC, finds a corresponding SM-DP according to the ID of the SM-DP, and executes step 10.

Step 9. If verifying that a new profile is not allowed to be downloaded into the eUICC, the SM-SR returns failure notification to the eUICC, and the solution ends.

Step 10. The SM-SR and the SM-DP perform bidirectional authorization.

Step 11. The SM-SR sends, to the SM-DP, the request for downloading the profile, where the request carries the token, the ID of the eUICC, and optionally, may further carry the ICCID, the identity of the terminal or the classification identity of the terminal, and an EIS.

(Step 6 to step 11 is a process in which the eUICC sends, to the SM-DP, the request for downloading the profile, and the download request is forwarded by the terminal and the SM-SR in the process, where the terminal provides only a transparent transmission function, and therefore, it may be considered that the process is direct communication between the eUICC and the SM-SR.)

Step 12. The SM-DP verifies whether the token carried in the request for downloading the profile is a valid token, and if the token is valid and the token is obtained by performing an encryption operation on the ICCID, the SM-DP performs a corresponding inverse operation to obtain the ICCID, so as to acquire the profile that needs to be downloaded; or if the request message in step 7 carries the ICCID, the SM-DP may acquire, according to the ICCID carried in the request message, the profile that needs to be downloaded; or the SM-DP may acquire, according to the ICCID locally stored in the SM-DP, the profile that needs to be downloaded.

Step 13. The SM-DP verifies, according to the EIS and the identity of the terminal or the classification identity of the terminal, whether the profile can be downloaded into the eUICC of the terminal (that the SM-DP verifies, according to an EIS, whether a profile can be downloaded into the eUICC is the same as that in the prior art described in the background).

Step 14. If the verification fails, return failure notification to the eUICC.

(Step 12 to step 14 is a process in which the SM-DP verifies the token and the identity of the terminal or the classification identity of the terminal to determine whether a particular profile can be downloaded into the eUICC.)

Step 15-17. After the verification in steps 12 and 13 succeeds, the SM-DP requests the SM-SR to create new storage space (which is subsequently marked as a container) in the eUICC.

Step 18. The SM-DP establishes a profile installer credential (profile installer credentials, PIC) by using the SM-SR and the eUICC, where the PIC is used to decrypt and install a downloaded profile, and establishing of the PIC may use an existing shared key generation method, such as key negotiation, key distribution, or the like.

Step 19. The SM-DP sends, to the eUICC, a request for downloading and installing the profile.

Step 20. The eUICC verifies whether the SM-DP is authorized to download and install the profile in the eUICC, which is specifically verified by using the PIC.

Step 21. The eUICC returns a verification response to the SM-DP.

Step 22. If the verification succeeds, the SM-DP initiates a procedure for downloading and installing the profile, and transmits an encrypted pro file to the eUICC by using the SM-SR.

Step 23. The eUICC performs integrity verification and the like on the received profile, and decrypts and installs the profile after the verification succeeds.

Step 24. The eUICC sends, to the SM-SR, a confirmation message of installation of the profile, where the confirmation message carries an updated EIS.

Step 25. The eUICC notifies the user that the profile has been successfully downloaded and installed.

Step 26. The SM-SR updates the EIS.

Step 27. The SM-SR sends, to the SM-DP, a confirmation message of downloading and installation of the profile.

Step 28. The SM-DP notifies the MNO that the profile identified by the ICCID has been downloaded into the eUICC identified by the eID, so that the MNO associates the eID with the ICCID.

In specific implementation, steps 15 to 28 in this embodiment is the same as those in the prior art, and detailed description of specific implementation of the steps is not provided herein again.

Figure 14A:
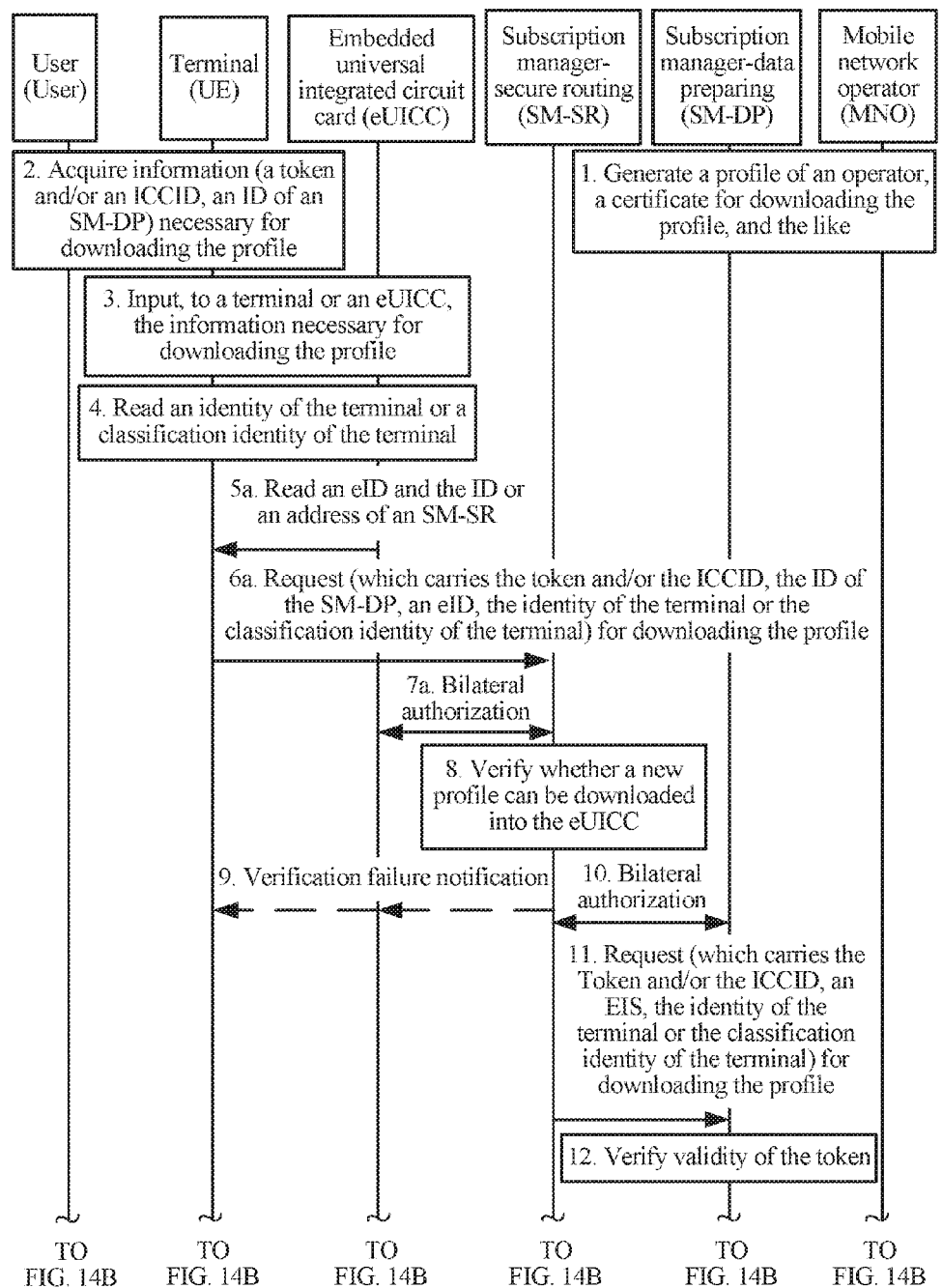
FIG. 14A and FIG. 14B are detailed schematic flowcharts of a method for downloading and installing a profile of an operator according to a twelfth embodiment of the present invention.
Figure 14B:
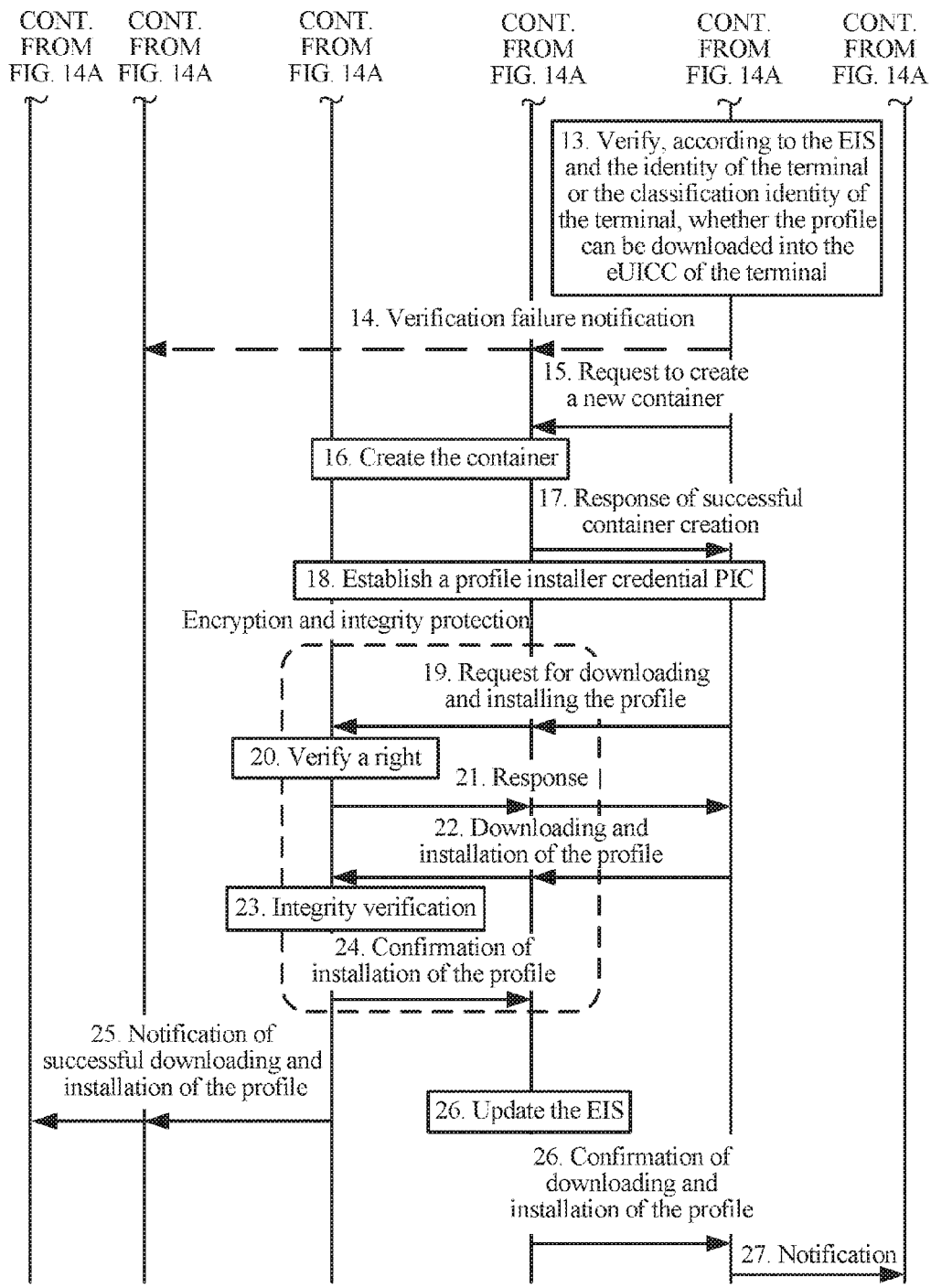

FIG. 14A and FIG. 14B are detailed schematic flowcharts of a method for downloading and installing a profile of an operator according to a twelfth embodiment of the present invention. The procedure includes related procedures in most foregoing embodiments of the present invention. In the following part, a profile is substituted for the subscription agreement of the operator in each of the foregoing embodiments, and a token is substituted for the download certificate in each of the foregoing embodiments. This embodiment and the embodiment shown in FIG. 13A and FIG. 13B differ in that a request for downloading a profile is initiated by a terminal instead of initiating by an eUICC. As shown in FIG. 14, the procedure includes:

Step 1. According to information provided by an MNO, an SM-DP generates, for the MNO, a profile that can be downloaded into an eUICC of a terminal, generates a token that is used to download the profile, and stores the token in the SM-DP. Optionally, the MNO may further limit a terminal or a terminal that is in a list and into which the profile can be downloaded (for example, a hatch of profiles generated for a batch of smart meters of a meter manufacturer can be downloaded into only this batch of meters of the meter manufacturer), or a type of a terminal (for example, whether the profile can be downloaded into only a smartphone or a terminal of the Internet of Things), where a manner of limiting the terminal or the type of the terminal may be embodied by using an identity of the terminal or a classification identity of the terminal.

Step 2. An end user selects an operator on line, or selects an operator in a retail store/business hall, or purchases a card (similar to a recharge card) specially used to download the profile, so as to acquire information necessary for downloading the profile, such as the token, or an ID of the SM-DP that stores the profile, optionally, the information may further include an ICCID of the profile.

Step 3. The user stores the token, the ID of the SM-DP, the ICCID, and the like to the terminal or the eUICC by using a related application on the terminal, or an application that is in the eUICC and is specially used to download the profile, or by scanning a two-dimensional code (if the information is in a form of a two-dimensional code).

Step 4. The related application of the terminal reads an identity (such as an IMEI) or a classification identity (for example, whether the terminal is an M2M device, a smartphone, or the like) of the terminal, where this step is optional and is unnecessarily executed.

Step 5a. The terminal reads, from the eUICC, information such as an ID of the eUICC and an ID or address of an SM-SR.

Step 6a. The terminal sends, to the SM-SR, a request for downloading the profile, where the request message carries the token, addressing information of the SM-DP, and the ID of the eUICC; optionally, the download request may further carry the identity of the terminal or the classification identity of the terminal.

Step 7a. The eUICC and the SM-SR perform bidirectional authorization. In this solution, the bidirectional authorization is initiated by the SM-SR.

Step 8. The SM-SR verifies whether a new profile is allowed to be downloaded into the eUICC (for example, the SM-SR detects whether a corresponding policy allows a new profile to be downloaded into the eUICC, and the like; for example, it is assumed that the terminal is a mobile carrier-branded smartphone, and the profile is a profile far accessing a telecommunications network, the profile for accessing a telecommunications network cannot be downloaded into an eUICC, of a mobile terminal, and in this case, a verification result of step 8 is that a new profile is not allowed to be downloaded into the eUICC), and if a new profile is allowed to be downloaded into the eUICC, finds a corresponding SM-DP according to the ID of the SM-DP, and executes step 10.

Step 9. If verifying that a new profile is not allowed to be downloaded into the eUICC, the SM-SR returns failure notification to the eUICC, and the solution ends.

Step 10. The SM-SR and the SM-DP perform bidirectional authorization.

Step 11. The SM-SR sends, to the SM-DP, the request for downloading the profile, where the request carries the token, the ID of the eUICC, and optionally, may further carry the ICCID, the identity of the terminal or the classification identity of the terminal, and an EIS.

(Step 6 to step 11 is a process in which the eUICC sends, to the SM-DP, the request for downloading the profile, and the download request is forwarded by the terminal and the SM-SR in the process, where the terminal provides only a transparent transmission function, and therefore, it may be considered that the process is direct communication between the eUICC and the SM-SR.)

Step 12. The SM-DP verifies whether the token carried in the request for downloading the profile is a valid token, and if the token is valid and the token is obtained by performing an encryption operation on the ICCID, the SM-DP performs a corresponding inverse operation to obtain the ICCID, so as to acquire the profile that needs to be downloaded; or if the request message in step 7 carries the ICCID, the SM-DP may acquire, according to the ICCID carried in the request message, the profile that needs to be downloaded; or the SM-DP may acquire, according to the ICCID locally stored in the SM-DP, the profile that needs to be downloaded.

Step 13. The SM-DP verifies, according to the EIS and the identity of the terminal or the classification identity of the terminal, whether the profile can be downloaded into the eUICC of the terminal (that the SM-DP verifies, according to an EIS, whether a profile can be downloaded into the eUICC is the same as that in the prior art described in the background).

Step 14. If the verification fails, return failure notification to the eUICC.

(Step 12 to step 14 is a process in which the SM-DP verifies the token and the identity of the terminal or the classification identity of the terminal to determine whether a particular profile can be downloaded into the eUICC.)

Step 15-17. The SM-DP requests the SM-SR to create new storage space (which is subsequently marked as a container) in the eUICC.

Step 18. The SM-DP establishes a profile installer credential (profile installer credentials, PIC) by using the SM-SR and the eUICC, where the PIC is used to decrypt and install a downloaded profile, and establishing of the PIC may use an existing shared key generation method, such as key negotiation, key distribution, or the like.

Step 19. The SM-DP sends, to the eUICC, a request for downloading and installing the profile.

Step 20. The eUICC verifies whether the SM-DP is authorized to download and install the profile in the eUICC, which is specifically verified by using the PIC.

Step 21. The eUICC returns a verification response to the SM-DP.

Step 22. If the verification succeeds, the SM-DP initiates a procedure for downloading and installing the profile, and transmits an encrypted profile to the eUICC by using the SM-SR.

Step 23. The eUICC performs integrity verification and the like on the received profile, and decrypts and installs the profile after the verification succeeds.

Step 24. The eUICC sends, to the SM-SR, a confirmation message of installation of the profile, where the confirmation message carries an updated EIS.

Step 25. The eUICC notifies the user that the profile has been successfully downloaded and installed.

Step 26. The SM-SR updates the EIS.

Step 27. The SM-SR sends, to the SM-DP, a confirmation message of downloading and installation of the profile.

Step 28. The SM-DP notifies the MNO that the profile identified by the ICCID has been downloaded into the eUICC identified by the eID, so that the MNO associates the eID with the ICCID.

The invention claimed is:
1. A method for downloading a profile of an operator, comprising:
acquiring, by a terminal, a download certificate used to download a profile of the operator, wherein the down- load certificate is generated by the operator or a subscription manager-data preparing (SM-DP);

sending, by the terminal to the SM-DP, a download request for downloading the profile of the operator, wherein the download request carries the download certificate and an ID of an embedded universal integrated circuit card (eUICC) of the terminal;

receiving, by the terminal, the profile of the operator that is sent by the SM-DP and is associated to the download request, and transmitting, by the terminal, the profile of the operator to the eUICC.

2. The method for downloading a profile of an operator according to claim 1, the sending, by the terminal to the SM-DP, a download request for downloading the profile of the operator comprises:

sending, by the terminal to an SM-SR with which the eUICC registers, the download request for downloading the profile of the operator, wherein the download request further comprises addressing information of the SM-DP, so that after finding the SM-DP according to the addressing information of the SM-DP, the SM-SR forwards, to the SM-DP, the download request that comprises the certificate for downloading the profile of the operator and the ID of the eUICC.

3. The method for downloading a profile of an operator according to claim 2, wherein the download certificate is a randomly generated sequence code; or the download certificate is a string of encoded data generated by encrypting metadata of the profile of the operator, wherein the metadata is extracted from the profile of the operator;

wherein the addressing information of the SM-DP is carried in the randomly generated sequence code or the string of encoded data.

4. The method for downloading a profile of an operator according to claim 1, before the sending, by the terminal to the SM-DP, a download request for downloading the profile of the operator, the method further comprises:

reading, by the terminal from the eUICC, the ID of the eUICC and addressing information of an SM-SR with which the eUICC registers, and finding the SM-SR according to the addressing information of the SM-SR; and generating, by the terminal, the download request for downloading the profile of the operator.

5. The method for downloading a profile of an operator according to claim 1, wherein the download certificate is a randomly generated sequence code; or the download certificate is a string of encoded data generated by encrypting metadata of the profile of the operator, wherein the metadata is extracted from the profile of the operator.

6. The method for downloading a profile of an operator according to claim 1, wherein the acquiring, by a terminal, a download certificate comprises:

logging in, by the terminal by using built-in application software of the terminal, to a network platform of the operator, and acquiring, by the terminal from the network platform, the download certificate.

7. The method for downloading a profile of an operator according to claim 1, wherein the acquiring, by a terminal, a download certificate comprises:

acquiring, by the terminal, the download certificate manually entered by a user.

8. The method for downloading a profile of an operator according to claim 1, wherein the acquiring, by a terminal, a download certificate comprises:

acquiring, by the terminal by scanning a two-dimensional code, the download certificate.

9. A method for downloading a profile of an operator, comprising:

receiving, by a subscription manager-data preparing (SM-DP) from a terminal, a download request for downloading a profile of the operator, wherein the download request carries an ID of an embedded universal integrated circuit card (eUICC) of the terminal and a download certificate for downloading the profile of the operator, wherein the download certificate is generated by the operator or the SM-DP;

verifying, by the SM-DP, that the download certificate for downloading the profile of the operator is valid;

acquiring, by the SM-DP, the profile of the operator that is stored in the SM-DP and is associated to the download request; and sending, by the SM-DP, the profile of the operator to the eUICC.

10. The method for downloading a profile of an operator according to claim 9, wherein the download certificate is a randomly generated sequence code; and when verifying that a sequence code that is carried in the download request and is used as the download certificate is the same as a sequence code stored in the SM-DP, the SM-DP determines that the download certificate carried in the download request is valid.

11. The method for downloading a profile of an operator according to claim 9, wherein:

the download certificate is a string of encoded data generated by encrypting metadata of the operator; and when metadata obtained after the SM-DP decodes, according to a locally stored decryption key, encoded data carried in the download request is the same as metadata that is of the profile of the operator and is stored in the SM-DP, the SM-DP determines that the download certificate carried in the download request is valid.

12. The method for downloading a profile of an operator according to claim 9, wherein:

the download request further carries an identity of the profile of the operator, and the identity of the profile of the operator is a part of the download certificate or is independent of the download certificate; and the SM-DP obtains the profile of the operator according to the identity that is of the profile of the operator and is carried in the download request.

13. A terminal, comprising an embedded universal integrated circuit card (eUICC), and further comprising:

an input apparatus, configured to: acquire a download certificate used to download a profile of an operator, wherein the download certificate is generated by the operator or a subscription manager-data preparing (SM-DP);

an output apparatus, configured to send, to the SM-DP, a download request for downloading the profile of the operator, wherein the download request carries the download certificate and an ID of the eUICC; and the input apparatus is further configured to: receive the profile of the operator that is sent by the SM-DP and is associated to the download request, and transmit the profile of the operator to the eUICC.

14. The terminal according to claim 13, an output apparatus, configured to send, to the SM-DP, a download request for downloading the profile of the operator, comprising:
the output apparatus, configured to send, to the SM-SR with which the eUICC registers, the download request for downloading the profile of the operator, wherein the download request further comprises addressing information of the SM-DP, so that after finding the SM-DP according to the addressing information of the SM-DP, the SM-SR forwards, to the SM-DP, the download request that comprises the certificate for downloading the profile of the operator and the ID of the eUICC.

15. The terminal according to claim 14, wherein the download certificate is a randomly generated sequence code; or
the download certificate is a string of encoded data generated by encrypting metadata of the operator, wherein the metadata is extracted from the profile of the operator;
wherein the addressing information of the SM-DP is carried in the randomly generated sequence code or the string of encoded data.

16. The terminal according to claim 13, wherein the terminal further comprises a processor, configured to:
read, from the eUICC, the ID of the eUICC and addressing information of an SM-SR with which the eUICC registers, and find the SM-SR according to the addressing information; and
generate the download request for downloading the profile of the operator.

17. The terminal according to claim 13, wherein the download certificate is a randomly generated sequence code; or
the download certificate is a string of encoded data generated by encrypting metadata of the operator, wherein the metadata is extracted from the profile of the operator.

18. The terminal according to claim 13, wherein the terminal further comprises a processor, configured to log in to a network platform of the operator by using built-in application software of the terminal, and acquire the download certificate from the network platform.

19. The terminal according to claim 13, wherein the input apparatus is further configured to acquire the download certificate manually entered by a user.

20. The terminal according to claim 13, wherein the input apparatus is further configured to acquire the download certificate by scanning a two-dimensional code.

21. A method for downloading a profile of an operator, comprising:
acquiring, by the terminal by scanning a two-dimensional code, a download certificate used to download a profile of the operator;
sending, by the terminal to an subscription manager-data preparing (SM-DP), a download request for downloading the profile of the operator, wherein the download request carries the download certificate;
receiving, by the terminal, the profile of the operator that is sent by the SM-DP and is associated to the download request, and
transmitting, by the terminal, the profile of the operator to an embedded universal integrated circuit card (eUICC) of the terminal.

* * * * *